United States Patent [19]
Fukushima et al.

[11] Patent Number: 5,941,354
[45] Date of Patent: Aug. 24, 1999

[54] LOCKUP DAMPER OF TORQUE CONVERTER

[75] Inventors: Hirotaka Fukushima; Hiroshi Mizukami; Mamoru Ohkubo, all of Neyagawa, Japan

[73] Assignee: EXEDY Corporation, Neyagawa, Japan

[21] Appl. No.: 08/977,678

[22] Filed: Nov. 24, 1997

[30] Foreign Application Priority Data

| | | | |
|---|---|---|---|
| Nov. 26, 1996 | [JP] | Japan | 8-314921 |
| Feb. 25, 1997 | [JP] | Japan | 9-041049 |
| Apr. 22, 1997 | [JP] | Japan | 9-104500 |

[51] Int. Cl.[6] .................................................. F16D 33/00
[52] U.S. Cl. .................. 192/3.28; 192/3.29; 192/3.3; 192/3.31; 464/66; 464/67
[58] Field of Search .................. 192/3.28, 3.29, 192/3.3, 3.31; 464/66, 67

[56] References Cited

U.S. PATENT DOCUMENTS

| | | |
|---|---|---|
| 4,188,805 | 2/1980 | Fall et al. . |
| 4,890,706 | 1/1990 | Miura et al. .............................. 192/3.28 |
| 4,961,487 | 10/1990 | Langeneckert .............................. 464/67 |
| 4,987,980 | 1/1991 | Fujimoto .................................. 192/3.28 |
| 5,186,293 | 2/1993 | Fujimoto .................................. 192/3.28 |
| 5,772,515 | 6/1998 | Yamakawa et al. ........................ 464/67 |

FOREIGN PATENT DOCUMENTS 3614158  10/1987  Germany .

*Primary Examiner*—Charles A Marmor
*Assistant Examiner*—Tisha D. Waddell
*Attorney, Agent, or Firm*—Shinjyu An Intellectual Property Firm

[57] ABSTRACT

A lockup damper of a torque converter 1 includes a retaining plate 14, a driven member 10, first coil springs 13A, second coil springs 13B and an intermediate plate 30. The first coil springs 13A are disposed between the retaining plate 14 and the driven plate 10. The second coil springs 13B are disposed between the retaining plate 14 and the first coil springs 13A. The intermediate plate 30 has spring support portions 32 disposed between the first and second coil springs 13A and 13B for circumferentially supporting the first and second coil springs 13A and 13B, and engagement portions 33a, 33b, 34a and 34b engageable with the retaining plate 14 or the driven member 10.

7 Claims, 15 Drawing Sheets

LOCKUP DAMPER OF TORQUE CONVERTER

BACKGROUND OF THE INVENTION

A. Field of the Invention

The present invention relates to a lockup damper included in a lockup mechanism of a torque converter for damping a vibration transmitted from an input rotary member to an output rotary member.

B. Description of the Background Art

In general, the damper mechanism transmits a torque from an input rotary member to an output rotary member, and simultaneously operates to damp a vibration transmitted from the input rotary member toward the output rotary member. A lockup mechanism, which is included in a lockup mechanism disposed inside the torque converter and will be referred to as a "lockup damper", is an example of the above damper mechanism.

The torque converter is internally provided with three kinds of vane wheels, i.e., an impeller, a turbine and a stator, and is operable to transmit a torque through a working fluid filling an internal space thereof. The impeller is fixed to a front cover coupled to the input rotary member. The working fluid flowing from the impeller to the turbine through the stator transmits a torque from the impeller to the turbine, and then is transmitted to the output rotary member coupled to the turbine.

The lockup mechanism is disposed between the turbine and the front cover for mechanically coupling the front cover and the turbine together and thereby directly transmitting the torque from the input rotary member to the output rotary member.

Usually, the lockup mechanism has a piston member which can be pressed against the front cover, a retaining plate fixed to the piston member, coil springs carried by the retaining plate and a driven member elastically coupled, in a rotating direction of the mechanism, to the piston member through the coil springs. The driven member is fixed to the turbine coupled to the output rotary member. The components of the lockup mechanism also form a lockup damper mechanism for absorbing and damping an applied vibration.

When the lockup mechanism operates, the piston member slides on or is pressed to the front cover so that the torque is transmitted from the front cover to the piston member, and then is transmitted to the turbine through the coil springs. The lockup mechanism transmits the torque, and also operates to absorb and damp the torsional or angular vibration owing to the lockup damper. The coil springs are repetitively compressed between the retaining plate fixed to the piston member and the driven member, and thereby slide on the retaining plate so that the vibration is damped.

Recently, such a lockup damper which includes elastic members arranged at a radially outer portion of a torque converter having a relatively large space has been used in many cases for reduction in axial distance of the torque converter. However, arrangement of the elastic members at the radially outer portion of the torque converter reduces an allowable maximum torsion angle of the torque converter compared with the structures including elastic members arranged at the radially middle or inner portion. For overcoming the above disadvantage, two elastic members may be arranged in series with an intermediate member or the like therebetween. The elastic members connected in series can be compressed by a large length, so that an intended maximum torsion angle can be ensured. Combination of two elastic members having different spring constants can provide the torsion characteristics of the lockup damper having two stages, and therefore can improve the torsion characteristics.

In the above lockup damper, it is necessary to provide a stop or stopper mechanism for restricting a relative rotation between the drive and driven members through an angle larger than a predetermined angle. Thus, a relative rotation between the drive and driven members must be inhibited by the operation of the stop mechanism when a torque larger than a predetermined value is transmitted. This stop mechanism may be formed of coil springs, which are employed as elastic members and can function as the stop mechanism when they are fully compressed.

However, the coil springs to be used also as the stop mechanism must have a sufficiently large endurance strength against the maximum torque load which may be transmitted, so that specifications of the coil springs cannot be selected from a wide range. This results in restriction of the damper characteristics and increase in cost of the coil springs. Recently, it has been desired to improve the durability of the lockup mechanism. Therefore, a load against the coil spring must be reduced.

If the elastic members (coil springs) are not used as the stop mechanism, an independent stop mechanism is required, which increases the numbers of parts and manufacturing steps as well as the manufacturing cost.

SUMMARY OF THE INVENTION

An object of the invention is to provide a lockup damper of a torque converter provided with a stop mechanism which can suppress increase in manufacturing costs, can reduce the load against elastic members, allows selection of specifications of the elastic members from a wider range, and allows setting of desirable torsion characteristics required in a motorized vehicle.

According to a first aspect of the invention, a lockup damper of a torque converter is included in a lockup mechanism of the torque converter. The lockup mechanism is provided for mechanically transmitting a torque from an input rotary member to an output rotary member. The lockup damper is operable to damp a vibration transmitted from the input rotary member to the output rotary member. The lockup damper of the torque converter includes an input member, an output member, a first elastic member, a second elastic member and an intermediate member. The input member is supplied with the torque from the input rotary member. The output member outputs the torque to the output rotary member. The first elastic member is arranged between the input member and the output member. The second elastic member is arranged between the input or output member and the first elastic member. The intermediate member has a support portion and an engagement portion. The support portion of the intermediate member is arranged between the first and second elastic members, and circumferentially supports the first and second elastic members. The engagement portion of the intermediate member can be engaged with at least one of the input and output members.

A torque transmitted from the input rotary member to the input member is transmitted to the first and second elastic members circumferentially coupled together via the support portion of the intermediate member. The torque is then transmitted from the elastic members to the output member, and is output to the output rotary member. A torsional vibration applied to the lockup damper together with the torque is absorbed and damped by repetitive compression of each elastic member as well as frictional sliding and others between each elastic member and another member.

The above lockup damper has torsion angle characteristics allowing a large torsion angle owing to series arrangement of the two elastic members with the intermediate member therebetween. Thereby, intended torsion angle characteristics can be ensured even in the case that the elastic members are arranged at a radially outer portion of the torque converter for reducing an axial size of the torque converter, i.e., in the case that the elastic members must have a large allowable compression length.

According to this aspect, the intermediate member of the lockup damper is provided with the engagement portion, which is engageable with at least one of the input and output members. Therefore, the intermediate member and the input or output member are engaged together via the engagement portion to form an integral structure before the elastic member arranged between the intermediate member and the input or output member is fully compressed to closely contact the coils together. Thus, the engagement portion functions as a stop. Thereby, at least one of the elastic members does not attain the fully compressed state during the operation, and thus do not act as a stop. Therefore, an elastic modulus and others of this elastic member can be selected from a wide range, and the torsion characteristics and stop torque which are required depending on a vehicle can be easily set.

According to a second aspect, the lockup damper of the torque converter of the first aspect further has such a feature that the input member has an input engagement portion engaging with the intermediate member, and the output member has an output engagement portion engaging with the intermediate member. Further, the first elastic member has an elastic modulus equal to that of the second elastic member. The intermediate member has a first front engagement portion, a first rear engagement portion, a second front engagement portion and a second rear engagement portion. The first front engagement portion engages rearward, in a rotating direction of the torque converter, with the input engagement portion. The first rear engagement portion engages forwardly, in the rotating direction of the torque converter, with the input engagement portion. The second front engagement portion engages rearward, in the rotating direction of the torque converter, with the output engagement portion. The second rear engagement portion engages forwardly, in the rotating direction of the torque converter, with the output engagement portion. When the torque is not applied to the input and output rotary members, a distance between the input engagement portion and the first front engagement portion is different from a distance between the output engagement portion and the second rear engagement portion. Also, a distance between the input engagement portion and the first rear engagement portion is different from a distance between the output engagement portion and the second front engagement portion.

In the above structure, when the output member rotates relatively to the input member in the direction opposite to the rotating direction of the torque converter, the first front engagement portion can engage with the input engagement portion to inhibit the elastic member arrange between the input member and the intermediate member from being compressed by a predetermined length or more. Also, engagement of the second rear engagement portion with the output engagement portion can inhibit compression of the elastic member arranged between the output member and the intermediate member by a predetermined length or more. When the output member rotates relatively to the input member in the same direction as the rotating direction of the torque converter, the first rear engagement portion can engage with the input engagement portion to inhibit the elastic member arranged between the input member and the intermediate member from being compressed by a predetermined length or more. Also, engagement of the second front engagement portion with the output engagement portion can inhibit compression of the elastic member arranged between the output member and the intermediate member by a predetermined length or more.

As described above, each engagement portion can engage with the input or output member to function as a stop for the input and output member before the elastic member is fully compressed regardless of the direction of the relative rotation of the input and output members. Since it is not necessary to use the elastic member as a stop, specifications of the elastic member can be selected from a wide range, and various torsion characteristics can be selected. Also, an intended stop torque can be set by appropriately selecting the structure and size of the engagement portions.

In the above structure, the lockup damper has torsion characteristics having two stages in spite of the fact that the first and second elastic members have the same elastic modulus. More specifically, when the output member rotates relatively to the input member in the direction opposite to the rotating direction of the torque converter, both the elastic members are compressed until one of the input and output engagement portions engages with the corresponding engagement portion, because the distance between the input engagement portion and the first front engagement portion is different from the distance between the output engagement portion and the second rear engagement portion. Thereafter, only one of the elastic members is compressed until the other of the input and output engagement portions engages with the corresponding engagement portion to connect the input and output members integrally with each other. When the output member rotates relatively to the input member in the same direction as the rotating direction of the torque converter, both the elastic members are compressed until one of the input and output engagement portions engages with the corresponding engagement portion, because the distance between the input engagement portion and the first rear engagement portion is different from the distance between the output engagement portion and the second front engagement portion. Thereafter, only one of the elastic members is compressed until the other of the input and output engagement portions engages with the corresponding engagement portion to connect the input and output members integrally with each other. Thereby, the torsion characteristics having the two stages can be achieved owing to employment of the intermediate member provided with the above engagement portion in contrast to a conventional structure which can have torsion characteristics having only one stage due to employment of the elastic members having an equal elastic modulus.

According to a third aspect, the lockup damper of the torque converter of the second aspect further has such a feature that the intermediate member includes an annular portion, a support portion, a first recess and a second recess. The support portion is provided at the annular portion, and supports the first and second elastic members. The first recess is formed by recessing the annular portion, and the first front engagement portion and the first rear engagement portion are formed at opposite ends of the first recess. The second recess is formed by recessing the annular portion, and the second front engagement portion and the second rear engagement portion are formed at opposite edges of the second recess.

In this aspect, since the intermediate member includes the annular portion, the intermediate member itself is prevented from shifting radially outwardly. Each engagement portion is formed by providing the recess formed by recessing the annular portion.

According to a fourth aspect, the lockup damper of the torque converter of the second aspect further has such a feature that the intermediate member includes an annular portion having first and second openings, and a support portion. The first opening extends in the axial direction of the torque converter through the annular portion, and the first front engagement portion and the first rear engagement portion are formed at circumferentially opposite ends of the first opening. The second opening extends in the axial direction of the torque converter through the annular portion, and the second front engagement portion and the second rear engagement portion are formed at circumferentially opposite ends of the second opening. The support portion supports the first and second elastic members. The input engagement portion is inserted into the first opening. The output engagement portion is inserted into the second opening.

In this aspect, since the intermediate member includes the annular portion, the intermediate member itself is prevented from shifting radially outwardly. Each engagement portion is formed by providing the opening at the annular portion.

According to a fifth aspect, the lockup damper of the torque converter of the second aspect further has such a feature that when a torque is not applied to the input and output rotary members, a larger one between the distance from the first front engagement portion to the input engagement portion and the distance from the second rear engagement portion to the output engagement portion is smaller than a deformation length allowed in one of the first and second elastic members. A smaller one between the distance from the first front engagement portion to the input engagement portion and the distance from the second rear engagement portion to the output engagement portion is smaller than a deformation length allowed in the other of the first and second elastic members. A larger one between the distance from the first rear engagement portion to the input engagement portion and the distance from the second front engagement portion to the output engagement portion is smaller than a deformation length allowed in one of the first and second elastic members. A smaller one between the distance from the first rear engagement portion to the input engagement portion and the distance from the second front engagement portion to the output engagement portion is smaller than a deformation length allowed in the other of the first and second elastic members.

In this aspect, when the torque is not applied to the input and output rotary members, the larger one between the distance from the first front engagement portion to the input engagement portion and the distance from the second rear engagement portion to the output engagement portion is smaller than the deformation length allowed in one of the first and second elastic members. Therefore, during the relative rotation of the output member to the input member in the direction opposite to the rotating direction of the torque converter, one of the elastic members is not compressed by a length exceeding the allowed deformation length after the first front engagement portion is engaged with the input engagement portion or after the second rear engagement portion is engaged with the output engagement portion. When the torque is not applied to the input and output rotary members, the smaller one between the distance from the first front engagement portion to the input engagement portion and the distance from the second rear engagement portion to the output engagement portion is smaller than the deformation length allowed in the other of the first and second elastic members. Therefore, the other elastic member is not compressed by a length exceeding the allowed deformation length after the first front engagement portion is engaged with the input engagement portion or after the second rear engagement portion is engaged with the output engagement portion. Meanwhile, when the torque is not applied to the input and output rotary members, the larger one between the distance from the first rear engagement portion to the input engagement portion and the distance from the second front engagement portion to the output engagement portion is smaller than the deformation length allowed in one of the first and second elastic members. Therefore, during the relative rotation of the output member to the input member in the same direction as the rotating direction of the torque converter, one of the elastic members is not compressed by a length exceeding the allowed deformation length after the first rear engagement portion is engaged with the input engagement portion or after the second front engagement portion is engaged with the output engagement portion. Further, the smaller one between the distance from the first rear engagement portion to the input engagement portion and the distance from the second front engagement portion to the output engagement portion is smaller than the deformation length allowed in the other of the first and second elastic members. Therefore, the other elastic member is not compressed by a length exceeding the allowed deformation length after the first rear engagement portion is engaged with the input engagement portion or after the second front engagement portion is engaged with the output engagement portion.

Owing to the above structure, it is possible to avoid the elastic member from being subjected to a load, which may fully compress the elastic member and therefore is severe in view of a durability and a strength, and therefore the elastic members can be selected from a wide range.

According to a sixth aspect, the lockup damper of the torque converter of the first aspect further has such a feature that the input member has an input engagement portion engaging with the intermediate member, and the output member has an output engagement portion engaging with the intermediate member. The first elastic member has an elastic modulus larger than that of the second elastic member. The intermediate member has a first front engagement portion, a first rear engagement portion, a second front engagement portion and a second rear engagement portion. The first front engagement portion engages rearward, in a rotating direction of the torque converter, with the input engagement portion. The first rear engagement portion engages forwardly, in the rotating direction of the torque converter, with the input engagement portion. The second front engagement portion engages rearward, in the rotating direction of the torque converter, with the output engagement portion. The second rear engagement portion engages forwardly, in the rotating direction of the torque converter, with the output engagement portion.

In the above structure, when the output member rotates relatively to the input member in the direction opposite to the rotating direction of the torque converter, the first engagement portion can engage with the input engagement portion to inhibit the elastic member arrange between the input member and the intermediate member from being compressed by a predetermined length or more. Also, engagement of the second rear engagement portion with the output engagement portion can inhibit compression of the elastic member arranged between the output member and the intermediate member by a predetermined length or more. When the output member rotates relatively to the input member in the same direction as the rotating direction of the torque converter, the first rear engagement portion can engage with the input engagement portion to inhibit the elastic member arranged between the input member and the intermediate member from being compressed by a predetermined length or more. Also, engagement of the second front engagement portion with the output engagement portion can inhibit compression of the elastic member arranged between the output member and the intermediate member by a predetermined length or more.

As described above, each engagement portion can engage with the input or output member to function as a stop for the input and output member before the elastic member is fully compressed regardless of the direction of the relative rotation of the input and output members. Since it is not necessary to use the elastic member as a stop, specifications of the elastic member can be selected from a wide range, and various torsion characteristics can be selected. Also, an intended stop torque can be set by appropriately selecting the structure and size of the engagement portions.

In the above structure, the lockup damper has torsion characteristics having two stages owing to the fact that the first and second elastic members have the different elastic moduli, respectively. Further, the distance from each engagement portion to the input or output engagement portion can be arbitrarily set, whereby various torsion characteristics can be set in the lockup damper, and for example, different torsion characteristics can be set depending on the directions of the relative rotation between the input and output members.

According to a seventh aspect, the lockup damper of the torque converter of the sixth aspect further has such a feature that the intermediate member includes an annular portion, a support portion, a first recess and a second recess. The support portion is provided at the annular portion, and supports the first and second elastic members. The first recess is formed by recessing the annular portion, and the first front engagement portion and the first rear engagement portion are formed at opposite ends of the first recess. The second recess is formed by recessing the annular portion, and the second front engagement portion and the second rear engagement portion are formed at opposite ends of the second recess.

According to an eighth aspect, the lockup damper of the torque converter of the sixth aspect further has such a feature that the intermediate member includes an annular portion having first and second openings, and a support portion. The first opening extends in the axial direction of the torque converter through the annular portion, and the first front engagement portion and the first rear engagement portion are formed at circumferentially opposite ends of the first opening. The second opening extends in the axial direction of the torque converter through the annular portion, and the second front engagement portion and the second rear engagement portion are formed at circumferentially opposite ends of the second opening. The support portion supports the first and second elastic members. The input engagement portion is inserted into the first opening. The output engagement portion is inserted into the second opening.

According to a ninth aspect, the lockup damper of the torque converter of the sixth aspect further has such a feature that when a torque is not applied to the input and output rotary members, a larger one between the distance from the first front engagement portion to the input engagement portion and the distance from the second rear engagement portion to the output engagement portion is smaller than a deformation length allowed in one of the first and second elastic members. A smaller one between the distance from the first front engagement portion to the input engagement portion and the distance from the second rear engagement portion to the output engagement portion is smaller than a deformation length allowed in the other of the first and second elastic members. A larger one between the distance from the first rear engagement portion to the input engagement portion and the distance from the second front engagement portion to the output engagement portion is smaller than a deformation length allowed in one of the first and second elastic members. A smaller one between the distance from the first rear engagement portion to the input engagement portion and the distance from the second front engagement portion to the output engagement portion is smaller than a deformation length allowed in the other of the first and second elastic members.

According to a tenth aspect, the lockup damper of the torque converter of the first aspect further has such a feature that the first elastic member has a larger elastic modulus than the second elastic member. The engagement portion of the intermediate member engages with the input or output member to suppress deformation of the second elastic member within an allowable deformation length.

Since the second elastic member has a smaller elastic modulus and therefore usually has a smaller endurance strength than the first elastic member, the second elastic member arranged between the intermediate member and the input or output member is prevented from being compressed by the compressive deformation length, which is allowed in view of the endurance strength, by engaging the engagement portion of the intermediate member with the input or output member. Thereby, the elastic modulus and others of the second elastic member can be selected from wide ranges.

Since the first elastic member has a larger strength than the second elastic member, first elastic member can transmit the torque in the fully compressed state, and thus can be used as a stop against relative rotation between the input and output members.

According to an eleventh aspect of the invention, a lockup damper of a torque converter is included in a lockup mechanism of the torque converter. The lockup mechanism is provided for mechanically transmitting a torque in a positive rotating direction from an input rotary member to an output rotary member. The lockup damper is operable to damp a vibration transmitted from the input rotary member to the output rotary member. The lockup damper of the torque converter comprises an input member, an output member, a first elastic member, a second elastic member and an intermediate member. The input member is supplied with the torque from the input rotary member. The output member outputs the torque to the output rotary member. The first elastic member is arranged between the input member and the output member. The second elastic member has a smaller elastic modulus than the first elastic member, and is arranged between the input or output member and the first elastic member. The intermediate member has a support portion and an engagement portion. The support portion of the intermediate member is arranged between the first and second elastic members, and circumferentially supports the first and second elastic members. The engagement portion of the intermediate member can be engaged with at least one of the input and output members for restricting a rotation of the second elastic member relative to the input or output member within a predetermined angle and thereby suppressing deformation of the second elastic member within an allowable deformation length when the input member rotates in the positive rotation direction relatively to the output member.

A torque transmitted from the input rotary member to the input member is transmitted to the first and second elastic members circumferentially coupled together via the support portion of the intermediate member. The torque is then transmitted from the elastic members to the output member, and is output to the output rotary member. A torsional vibration applied to the lockup damper together with the torque is absorbed and damped by repetitive compression of each elastic member as well as frictional sliding and others between each elastic member and another member.

The above lockup damper has torsion angle characteristics allowing a large torsion angle owing to series arrangement of the two elastic members with the intermediate member therebetween. Thereby, intended torsion angle characteristics can be ensured even in the case that the elastic members are arranged at a radially outer portion of the torque converter for reducing an axial size of the torque converter, i.e., in the case that the elastic members must have a large allowable compression length.

According to this aspect, the intermediate member of the lockup damper is provided with the engagement portion, which is engageable with the input or output member. Engagement of the engagement portion with the input or output member restricts the relative rotation of the intermediate member exceeding the predetermined angle with respect to the input or output member when the input member rotates in the positive rotation direction with respect to the output member, so that deformation of the second elastic member is suppressed within the allowable deformation length. Thus, the torque acting on the lockup damper of the torque converter, and particularly the torque which may affect the lifetime of the elastic member acts when the input member rotates in the positive rotation direction relatively to the output member. Also, the first elastic member has a large elastic modulus and therefore a large endurance strength so that the first elastic member can keep a sufficient lifetime even if it is used also as a stop. The structure of this aspect is employed in view of these facts, and only the second elastic member is particularly protected from the relative rotation in one of the rotating directions of the lockup damper. Therefore, the structure of this aspect can be simple compared with structures of stops in such cases that the second elastic member is to be protected in both the rotating directions, and that the first elastic member is also to be protected. Accordingly, deformation of the second elastic member having a low durability is suppressed within the allowable deformation length by a stop mechanism which can suppress increase in manufacturing cost so that design specification of the second elastic member can be selected from a wide range, and required torsion characteristics can be set easily in accordance with a vehicle. For example, the rigidity of the second elastic member may be further reduced to improve properties of absorbing a minute torsional vibration.

According to a twelfth aspect, the lockup damper of the torque converter of the eleventh aspect further has such a feature that the first elastic member is arranged at the front, in the positive rotating direction of the torque converter, of the support portion of the intermediate portion. The second elastic member is arranged at the front, in the negative rotating direction of the torque converter, of the support portion of the intermediate portion. The input member has an input engagement portion engageable with the engagement portion of the intermediate member. The engagement portion of the intermediate member is arranged at the front, in the positive rotating direction of the torque converter, of the input engagement portion.

According to this structure, the torque in the positive rotating direction transmitted from the input rotary member to the input member is transmitted from the input member to the second elastic member. The torque is then transmitted from the second elastic member to the output member through the support portion of the intermediate member and the first elastic member, and is output to the output rotary member. When the torque is large, the input member pushes and thereby compresses the second elastic member to eliminate a space between the input engagement portion and the engagement portion of the intermediate member, and thus bring the input engagement portion into contact with the engagement portion of the intermediate member. Thereafter, the torque is transmitted through a torque transmission route from the input member to the intermediate member via the input engagement portion and the engagement portion of the intermediate member in addition to the aforementioned torque transmission route from the input member to the intermediate member via the second elastic member. In this structure, the compressive deformation length of the second elastic member at the time of contact of the input engagement portion with the engagement portion of the intermediate member is set not to exceed a deformation length which is allowed in view of the strength. Since the input engagement portion and the engagement portion of the intermediate member act as a stop mechanism, the second elastic member is not compressed by a length exceeding the aforementioned predetermined compressive deformation length. Therefore, the torque which exceeds the elastic reaction force of the second elastic member deformed by the predetermined compressive deformation length is transmitted through the torque transmission route from the input member to the intermediate member via the input engagement portion and the engagement portion of the intermediate member. As described above, the input engagement portion and the engagement portion of the intermediate member function as the stop mechanism restricting the force acting on the second elastic member. Therefore the second elastic member has an improved durability.

According to a thirteenth aspect, the lockup damper of the torque converter of the eleventh aspect further has such a feature that the first elastic member is arranged at the front, in the negative rotating direction of the torque converter, of the support portion of the intermediate portion. The second elastic member is arranged at the front, in the positive rotating direction of the torque converter, of the support portion of the intermediate portion. The output member has an output engagement portion engageable with the engagement portion of the intermediate member. The engagement portion of the intermediate member is arranged at the rear, in the positive rotating direction of the torque converter, of the output engagement portion.

According to this structure, the torque in the positive rotating direction transmitted from the input rotary member to the input member is transmitted from the input member to the first elastic member. The torque is then transmitted from the first elastic member to the output member through the first elastic member, the support portion of the intermediate member and the second elastic member, and is output to the output rotary member. When the torque is large, the input member pushes the second elastic member through the first elastic member and the support portion of the intermediate member and thereby compresses the second elastic member to eliminate a space between the output engagement portion and the engagement portion of the intermediate member, and thus bring the output engagement portion into contact with the engagement portion of the intermediate member. Thereafter, the torque is transmitted through a torque transmission route from the intermediate member to the output member via the engagement portion of the intermediate member and the output engagement portion in addition to the aforementioned torque transmission route from the intermediate member to the output member via the second elastic member. In this structure, the compressive deformation length of the second elastic member at the time of contact of the output engagement portion with the engagement portion of the intermediate member is set not to exceed a deformation length which is allowed in view of the strength. Since the output engagement portion and the engagement portion of the intermediate member act as a stop mechanism, the second elastic member is not compressed by a length exceeding the aforementioned predetermined compressive deformation length. Therefore, the torque which exceeds the elastic reaction force of the second elastic member deformed by the predetermined compressive deformation length is transmitted through the torque transmission route from the intermediate member to the output member via the engagement portion of the intermediate member and the output engagement portion. As described above, the force acting on the second elastic member is restricted so that the second elastic member has an improved durability.

According to a fourteenth aspect, the lockup damper of the torque converter of the eleventh aspect further has such a feature that the first and second elastic members are arranged at a radially outer portion of the torque converter.

The foregoing and other objects, features, aspects and advantages of the present invention will become more apparent from the following detailed description, when taken in conjunction with the accompanying drawings.

DESCRIPTION OF THE PREFERRED EMBODIMENTS

FIRST EMBODIMENT

Figure 1:
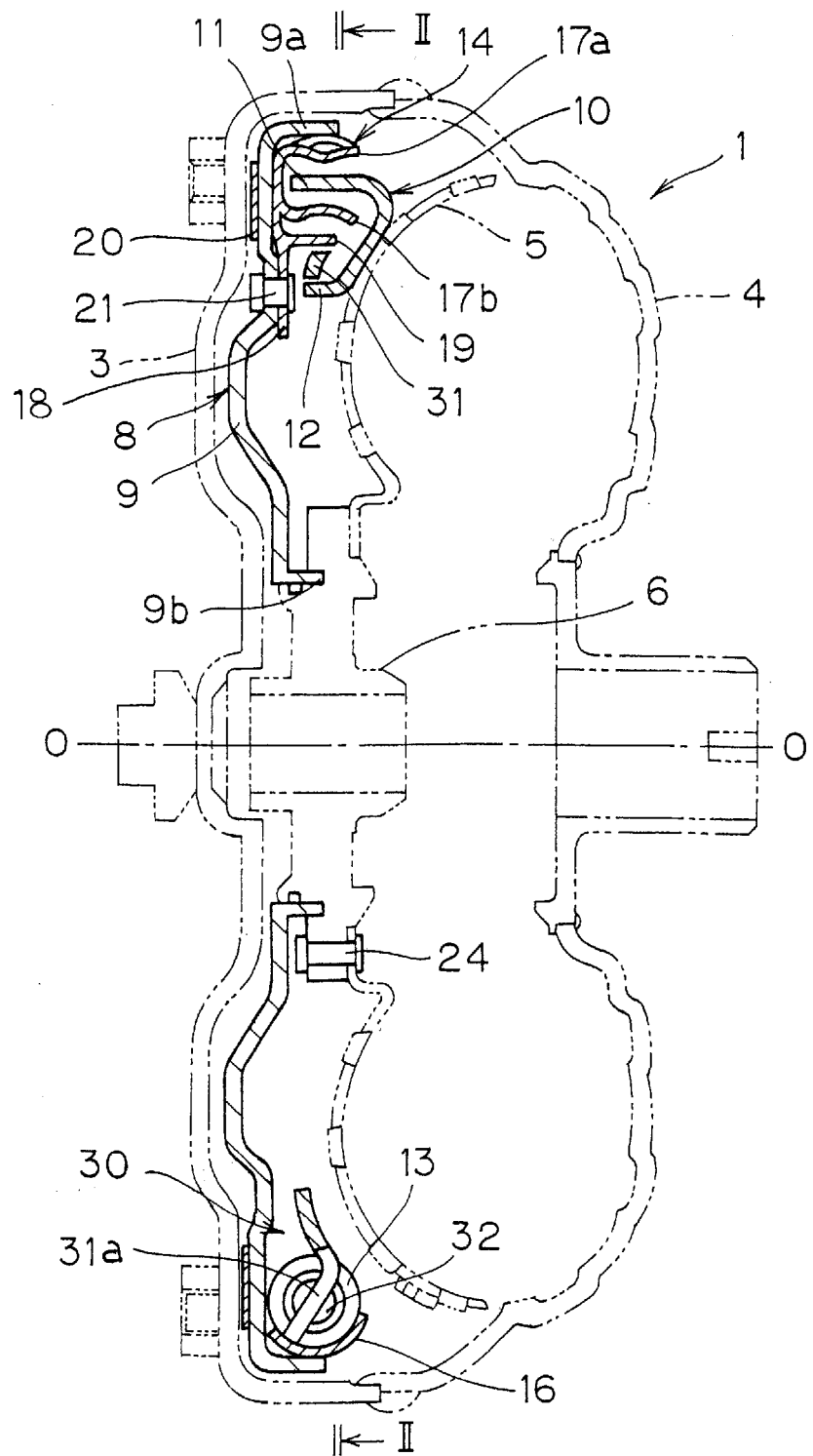
FIG. 1 is a schematic cross section of a torque converter having a lockup damper in accordance with a first embodiment of the present invention.

A torque converter 1 shown in 1 is formed of a front cover 3, a torque converter main unit, which is formed of an impeller 4, a turbine 5 and a stator (not shown), and a lockup mechanism 8. An engine, not shown, is disposed to the left of the torque converter 1 in FIG. 1, and a transmission (not shown) is disposed to the right of the torque converter 1 in FIG. 1. Hereinafter, the left side of FIG. 1 will be referred to as the engine side and the right side of FIG. 1 are referred to as the transmission side.

The front cover 3 and a shell of the impeller 4 defines a working fluid chamber filled with working fluid. The impeller 4, turbine 5 and stator (not shown) have the generally the same structures as those in the prior art, and therefore will not be described below in detail. A shell of the turbine 5 is fixed at its inner peripheral portion to a turbine hub 6 by rivets 24. The turbine hub 6 is spline-fitted to a shaft (not shown) extending from a transmission.

The lockup mechanism 8 is provided for mechanically transmitting torque from the front cover 3 to the turbine 5 and turbine hub 6, and for damping a vibration transmitted thereto. The lockup mechanism 8 is basically formed of an input piston member 9, an output driven member 10, four elastic members, i.e., four coil springs 13, a retaining plate 14 forming an input member, and an intermediate plate 30.

The piston member 9 is operable to move toward or away from the front cover 3 in accordance with control of the hydraulic pressure in the torque converter main unit. The piston member 9 is substantially formed of a circular plate, and has outer and inner peripheral projections 9a and 9b. The outer and inner peripheral projections 9a and 9b extend toward the transmission (rightward in FIG. 1). The inner peripheral projection 9b is carried relatively rotatably and axially movably on the outer peripheral surface of the turbine hub 6. When the clutch of the lockup mechanism is disengaged, the inner peripheral projection 9b is in contact with the turbine hub 6, and can axially move only toward the front cover 3. A side surface of the outer peripheral portion of the piston member 9 is covered with a circular friction facing 20 which is fixed thereto and is opposed to the friction surface of the front cover 3.

The retaining plate 14 is primarily provided for holding the coil springs 13 on the piston member 9. The retaining plate 14 is arranged radially inside the outer peripheral projection 9a of the piston member 9. The retaining plate 14 has an outer bent portion 16 having an arc-shaped section. The outer peripheral surface of the outer bent portion 16 is in contact with the inner peripheral surface of the outer peripheral projection 9a. The outer peripheral portion 16 is provided at circumferentially equally space two positions (diametrically opposed to each other) with circumferential support portions 17a and 17b which are bent and projected toward the inner periphery and the transmission. Further, a fixing portion 18 extends radially inward from each set of the circumferential support portions 17a and 17b. Each fixing portion 18 extends circumferentially over a predetermined angle, and is fixed to the piston member 9 by three rivets 21. Input engagement portions 19 extending toward the transmission are arranged radially inside the circumferential support portions 17a and 17b. The radial position of the input engagement portion 19 corresponds to a radial position of a first recess 33 formed at the intermediate plate 30 which will be described later.

The driven plate 10 is substantially formed of an annular plate, and is welded to the outer peripheral portion of the shell of the turbine 5. Two support portions 11 protrude toward the engine from the driven member 10. Each support portion 11 is arranged between the circumferential support portions 17a and 17b of the retaining plate 14. Two output engagement portions 12 protrude from the inner periphery of the driven member 10 toward the engine. The radial position of the output engagement portion 12 corresponds to a radial position of a second recess 34 formed at the intermediate plate 30 which will be described later.

Figure 2:
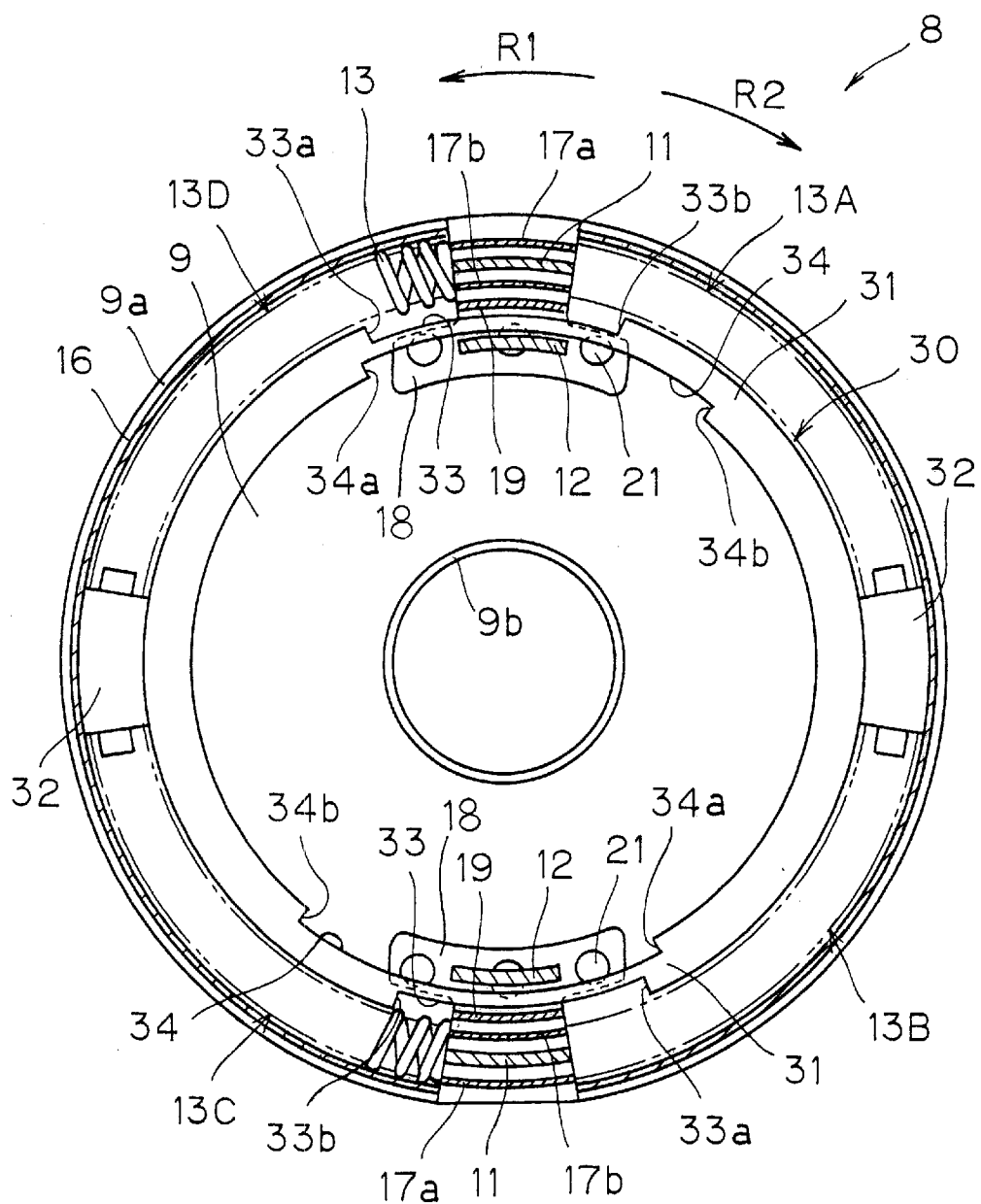
FIG. 2 is a cross section taken along the line II—II in FIG. 1.

Each coil spring 13 is operable to transmit a torque in the lockup mechanism 8, and is also operable to absorb and damp a minute torsional vibration caused by variation in rotation of the engine and a vibration due to a shock caused by the engaging operation of the clutch. The coil spring 13 elastically couples, in the rotating direction of the torque converter, the piston member 9 and the driven member 10 together through the retaining plate 14. As shown in FIG. 2, first and second coil springs 13A and 13B are arranged in one of the arc-shaped spaces defined between two sets of the diametrically opposed circumferential support portions 17a and 17b and the support portion 11. Third and fourth coil springs 13C and 13D are arranged in the other of the arc-shaped spaces defined between the diametrically opposed circumferential support portions 17a and 17b and the support portion 11.

The first and second coil springs 13A and 13B are arranged in series with a spring support portion 32 of the intermediate plate 30, which will be described later, therebetween, and the third and fourth coil springs 13C and 13D are likewise arranged in series with the spring support portion 32 therebetween. The combination of the first and third coil springs 13A and 13C and the combination of the second and fourth coil springs 13B and 13D can exhibit a large maximum torsion angle characteristics as a whole.

The intermediate plate 30 is provided for radially coupling the coil springs 13 together and thereby restricting a radially outward movement of the coil springs 13. The intermediate plate 30 can engage with the input engagement portion 19 or the output engagement portion 12, and thereby can also function as a stop against relative rotation of the input members, i.e., piston member 9 and the retaining plate 14 with respect to the output member, i.e., driven plate 10. The intermediate plate 30 is primarily formed of an annular plate 31, spring support portions 32 which are provided at projections 31a projected radially outward from the annular plate 31, and first and second recesses 33 and 34 formed by recessing the annular plate 31.

The annular plate 31 is located radially inside the coil springs 13 and is relatively rotatably arranged axially between the retaining plate 14 and the turbine 5.

The spring support portions 32 are attached to projections 31a projecting radially outward from the diametrically opposed two portions of the annular plate 31. One of the spring support portions 32 is arranged between the first and second coil springs 13A and 13B, and the other is arranged between the third and fourth coil springs 13C and 13D. The spring support portions 32 are fitted into the ends of the coil springs 13 for supporting the ends thereof, and thereby couple the coil springs 13A and 13B together in series as well as the coil springs 13C and 13D together in series.

The first recesses 33 are formed at the circumferentially spaced two positions of the intermediate plate 30 by recessing the outer peripheral portion of the annular plate 31. The opposite end surfaces of each first recess 33 form a first front engagement portion 33a and a first rear engagement portion 33b engaging with the input engagement portion 19, respectively. The first front engagement portion 33a is formed of the front end surface, in the rotating direction of the torque converter 1, of the first recess 33. The first rear engagement portion 33b is formed of the rear end surface, in the rotating direction of the torque converter 1, of the first recess 33. The input engagement portion 19 of the retaining plate 14 is arranged in the first recess 33.

The second recesses 34 are formed at the circumferentially spaced two positions of the intermediate plate 30 by recessing the inner peripheral portion of the annular plate 31. The opposite end surfaces of each second recess 34 form a second front engagement portion 34a and a second rear engagement portion 34b engaging with the output engagement portion 12, respectively. The second front engagement portion 34a is formed of the front end surface, in the rotating direction of the torque converter 1, of the second recess 34. The second rear engagement portion 34b is formed of the rear end surface, in the rotating direction of the torque converter 1, of the first recess 34. The output engagement portion 12 of the driven member 10 is arranged in the second recess 34.

Figure 3:
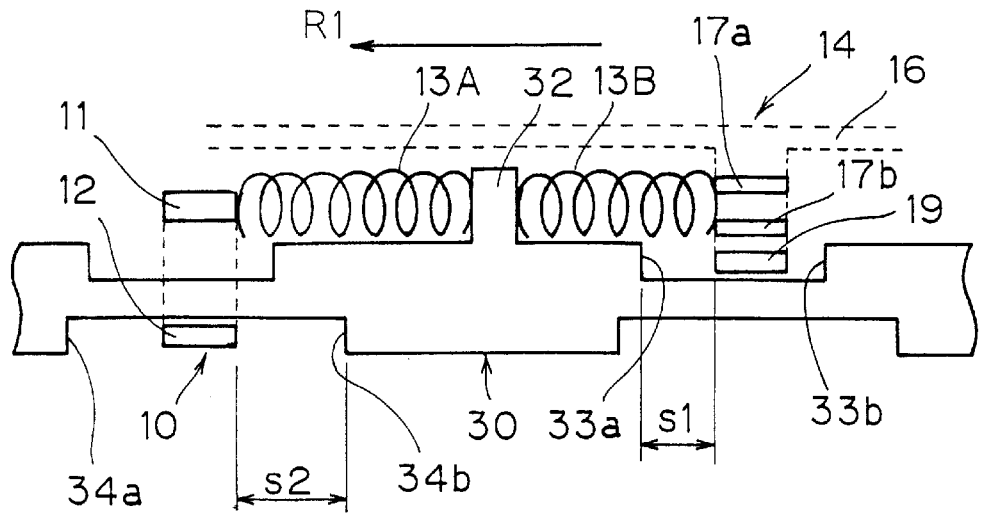
FIG. 3 is a fragmentary side view diagram showing portions of the lockup damper of the torque converter depicted in FIG. 1.

FIG. 3 schematically shows major members forming the lockup damper included in the lockup mechanism 8. FIG. 3 shows a state that a torque is not applied to the piston member 9 carrying the retaining plate 14 and the driven member 10. In this state, a distance (s1) between the input engagement portion 19 and the first front engagement portion 33a is shorter than a distance (s2) between the output engagement portion 12 and the second rear engagement portion 34b. A distance between the input engagement portion 19 and the first rear engagement portion 33b is shorter than a distance between the output engagement portion 12 and the second front engagement portion 34a.

An operation will now be described below.

When the lockup mechanism 8 is in the disengaged state and the working fluid between the front cover 3 and the piston member 9 is drained, the piston member 9 moves toward the front cover 3 so that the friction facing 20 comes into close contact with the friction surface of the front cover 3. Thereby, the torque of the front cover 3 is transmitted to the piston member 9, and is further transmitted to the turbine 5 via the retaining plate 14, coil springs 13 and drive member 10. The torque thus transmitted is output from the turbine hub 6 to the shaft (not shown) extending from the transmission. The direction of the input torque, i.e., the rotating direction of the torque converter 1 is indicated by R1 in FIG. 2.

When a minute torsional vibration is supplied to the front cover 3 during the engaged state of the lockup mechanism, a relative rotation cyclically occurs between the piston member 9 and the driven member 10 so that the coil springs 13 circumferentially expand and contract. In this operation, the minute torsional vibration is effectively absorbed owing to the characteristics of the coil springs 13 exhibiting the large maximum torsion angle. The compressed coil spring 13 tends to protrude radially outward, and also tends to move radially outward due to a centrifugal force. However, the coil springs 13 coupled together (i.e., the first and second coil springs 13A and 13B as well as the third and fourth coil springs 13C and 13D) are carried at their coupled portions by the spring support portions 32 so that a radially outward movement of them is suppressed. Consequently, frictional sliding is suppressed between the coil springs 13 and the outer bent portion 16. Thus, the frictional resistance occurring between the coil springs 13 and the outer bent portion 16 is small, and the coil springs 13 can effectively absorb the minute torsional vibration.

Figure 4:
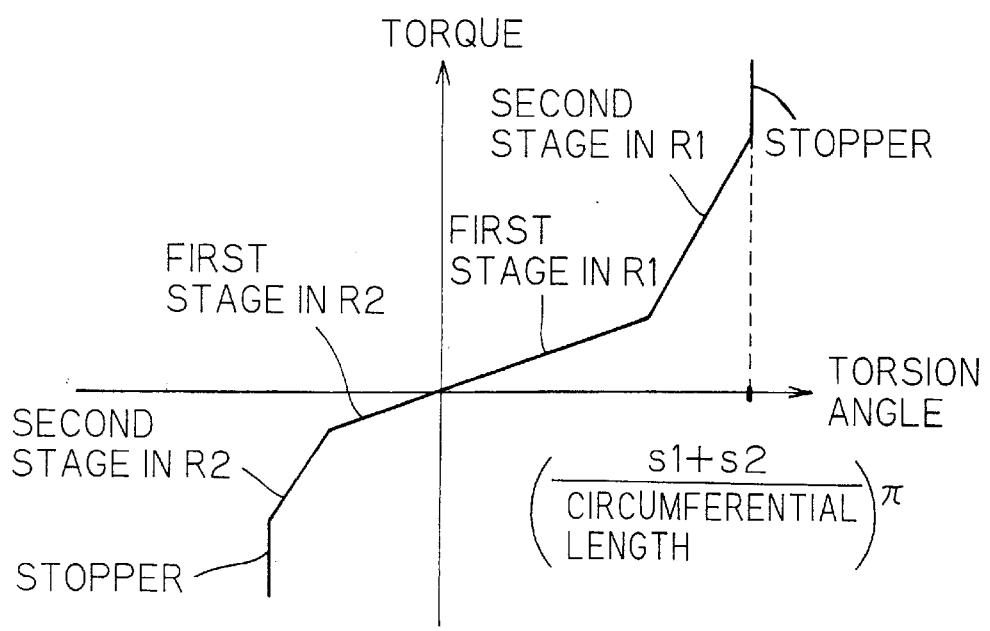
FIG. 4 is a diagram showing torsion angle and torque characteristics of the lockup damper of both the first and second embodiments, the first embodiment being depicted in FIGS. 1—3 and the second embodiment being depicted in FIGS. 5—10.

When the lockup clutch is being engaged or disengaged, a relatively large torsional vibration occurs due to a shock or the like. In this operation, the piston member 9 and the driven member 10 repeat large relative rotations in both the directions so that the vibration is damped. When the piston member 9 and the retaining plate 14 start to rotate in the direction R1 in FIG. 2 relatively to the driven member 10 owing to the torque difference between the piston member 9 and the driven member 10, the circumferential support portions 17a and 17b push the rear ends, in the rotating direction, of the coupled coil springs 13 (13A and 13B, and 13C and 13D) (see FIG. 3). The forward ends, in the rotating direction, of the coupled coil springs 13 are supported by the support portions 11, so that the coil springs 13 are compressed. In accordance with the relative rotation, each coil spring 13 is compressed, so that the piston member 9 and the retaining plate 14 rotate relatively to the driven member 10, and the intermediate plate 30 also rotates through a degree corresponding to a difference between the relative rotation degree of the piston member 9 and the compression degree of the second and fourth coil springs 13B and 13D. After the input engagement portion 19 of the retaining plate 14 engages with the first front engagement portion 33a of the intermediate plate 30, the piston member 9 and the retaining plate 14 are integrally coupled to the intermediate plate 30 for relative rotation to the driven member 10. Also the second and fourth coil springs 13B and 13D are no longer compressed, and only the first and third coil springs 13A and 13C are further compressed, so that the damper characteristics change (from first stage in R1 to second stage in R2 in FIG. 4). When the relative rotation is further performed to a certain extent, the second rear engagement portion 34b of the intermediate plate 30 engages with the output engagement portion 12 of the driven plate 10. Thereby, the piston member 9 and the retaining plate 14 are coupled to the driven member 10 via the intermediate plate 30 for integral rotation in the rotating direction R1, so that relative rotation of the piston member 9 and the retaining plate 14 with respect to the driven member 10 is inhibited (change from the second stage in R1 to the stop in FIG. 4). Thus, as shown in FIG. 4, the intermediate plate 30 generates the damper characteristics having the two stages, and also acts as the stop. In the above operation, the maximum relative rotation angle, which the piston member 9 and the retaining plate 14 can attain in the direction R1 with respect to the driven member 10 when restricted by the stop, is equal to a value obtained by dividing a product of (s1+s2) and $\pi$, where s1 is the distance between the input engagement portion 19 and the first front engagement portion 33a and s2 is the distance between the output engagement portion 12 and the second rear engagement portion 34b, by a circumferential length of the intermediate plate 30. When the piston member 9 and the retaining plate 14 rotate in the direction R2 in FIG. 2 relatively to the driven member 10, a phenomenon opposite to the above occurs. More specifically, after the input engagement portion 19 engages with the first rear engagement portion 33b, the first and third coil springs 13A and 13C are compressed no longer so that the damper characteristics change (from the first stage in R2 to the second stage in R2 in FIG. 4). When the relative rotation occurs further, the second front engagement portion 34a engages with output engagement portion 12, and the relative rotation of the piston member 9 and the retaining plate 14 with respect to the driven member 10 is inhibited (characteristics changes from the second stage in R2 to the stopper in FIG. 4).

As described above, the lockup damper of the lockup mechanism 8 has the torsion characteristics allowing a large torsion angle and having two stages. Therefore, the torsional vibration can be absorbed and damped efficiently.

In the above embodiment, the coil springs 13 are arranged in the outer peripheral portion of the torque converter 1, and the lockup damper is formed in the small space at the outer peripheral portion. This structure is possible because the intermediate plate 30 functions as the stop mechanism. The coil springs 13 are not used as a stopper mechanism, and the positions of the respective engagement portions are determined to prevent compression of the coil springs 13 exceeding the allowed compression lengths. Thereby, the coil springs 13 can surely have the durability. The timings of engagement with the front and rear portions, in the rotating direction of the torque converter 1, of the input engagement portion 19 and engagement with the front and rear portions, in the rotating direction of the torque converter 1, of the output engagement portion 12 can be arbitrarily and variously selected by changing the ranges of the recesses at the intermediate plate 30, and thereby the damper characteristics of the lockup damper can be variously selected. This embodiment is designed such that the relative rotation of the piston member 9 with respect to the driven member 10 in the positive rotation direction of the torque converter 1 exhibits the damper characteristics different from those by the negative rotation direction. Thus, the above embodiment is designed such that the point or timing of change in the damper characteristics and the maximum relative rotation degree determined by the stop in the positive rotation direction are different from those in the negative rotation direction.

SECOND EMBODIMENT

Figure 5:
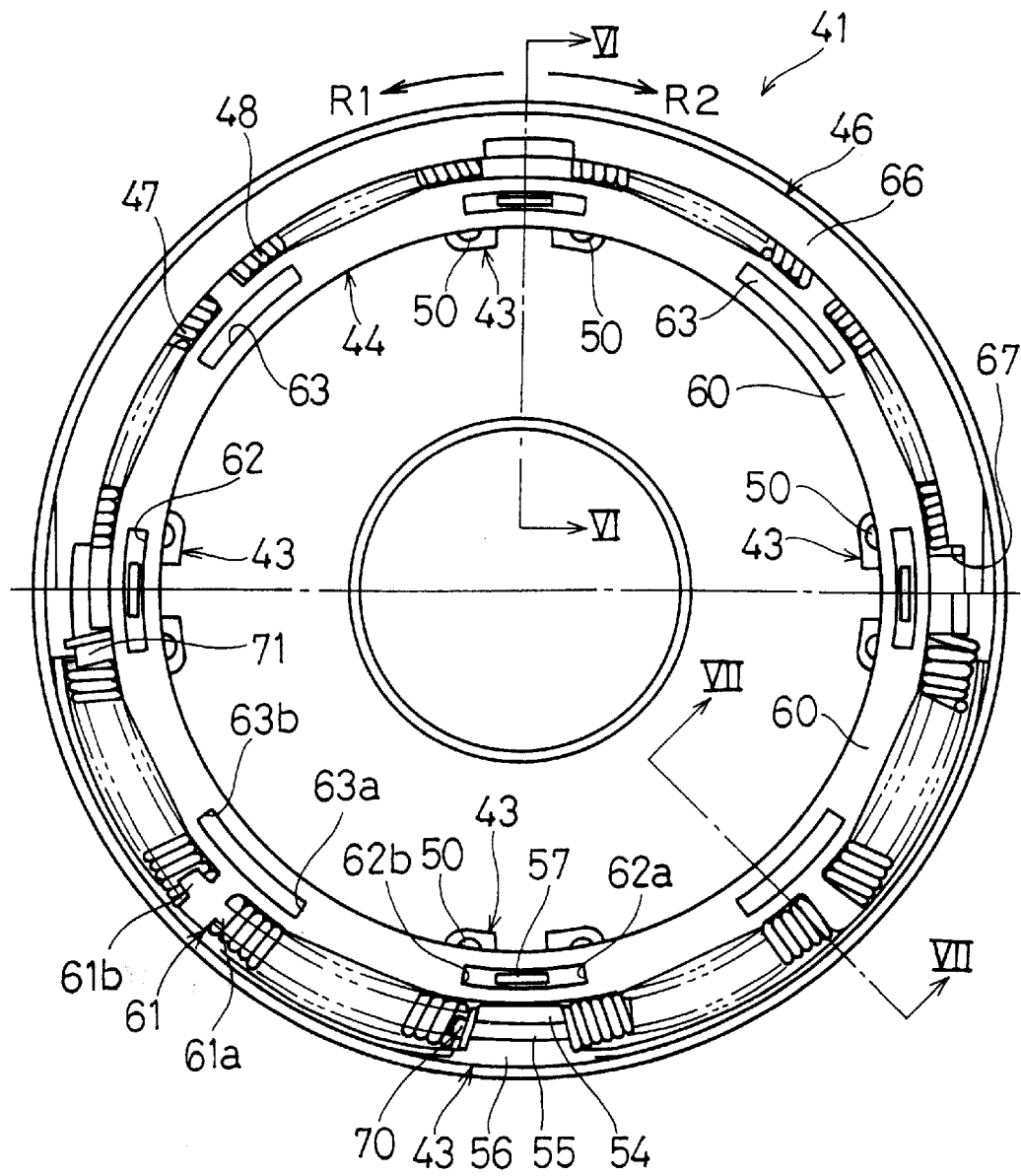
FIG. 5 is a schematic cross section similar to FIG. 2, showing a lockup mechanism in accordance with a second embodiment of the present invention.
Figure 6:
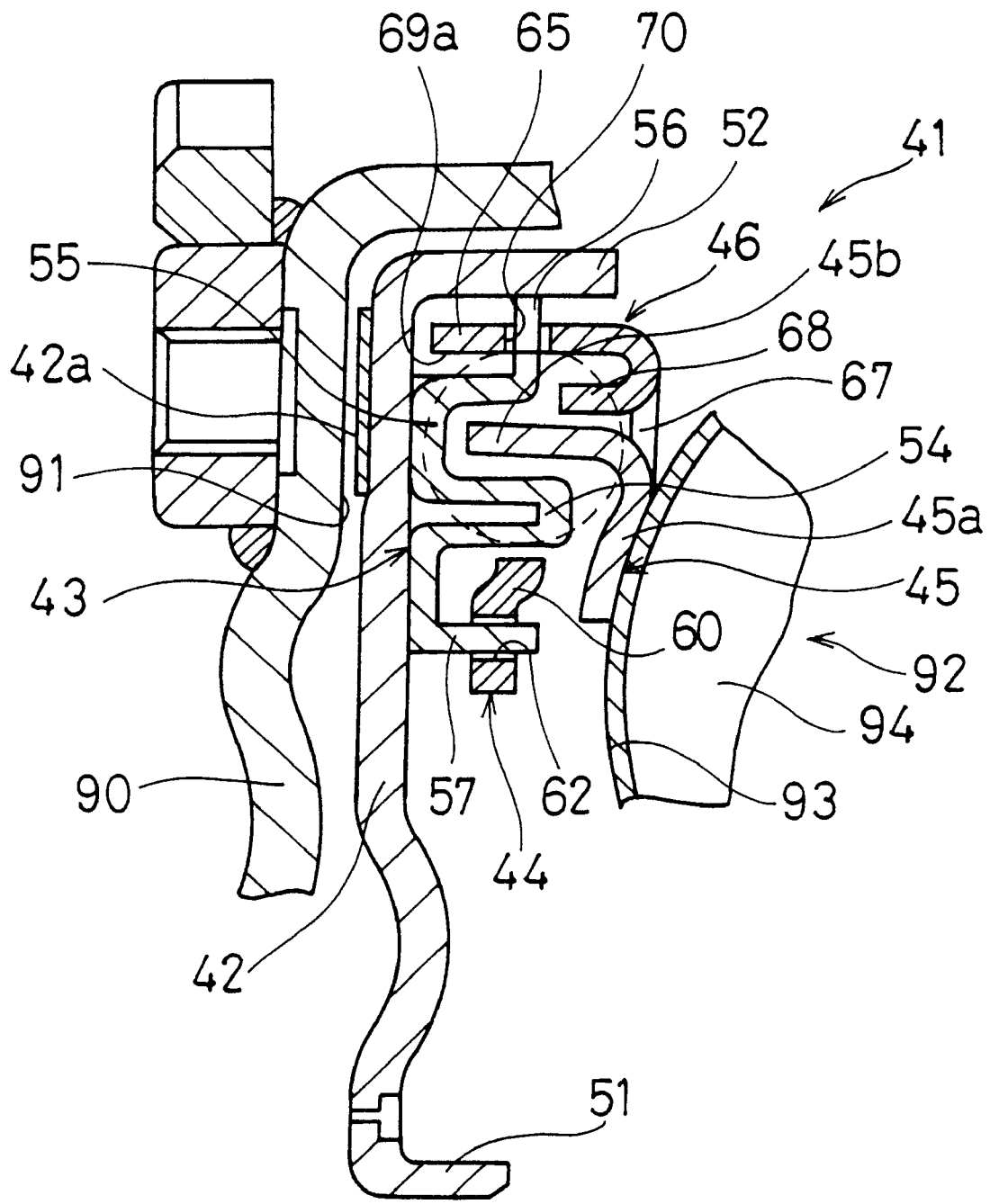
FIG. 6 is a cross section taken along line VI—VI in FIG. 5.
Figure 7:
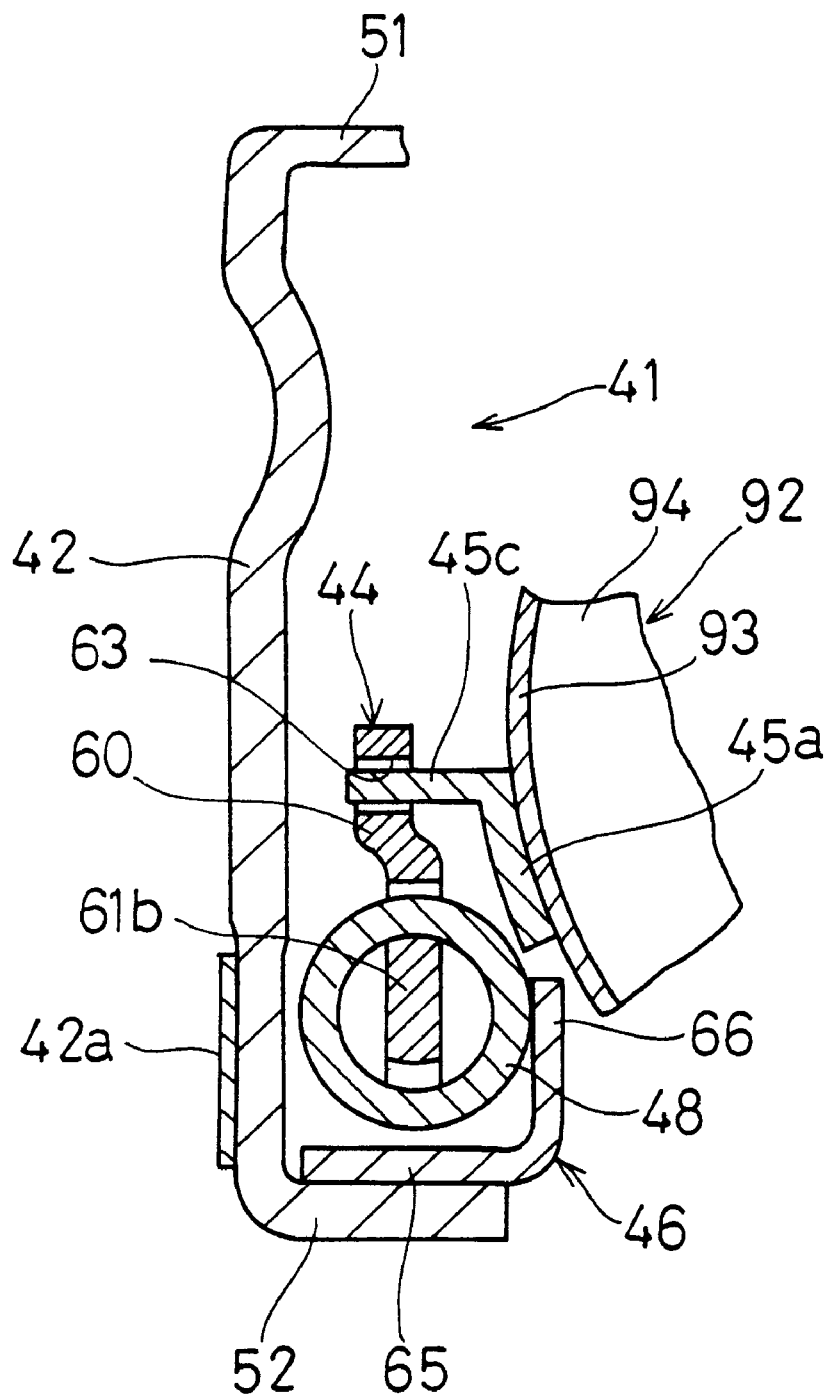
FIG. 7 is a cross section taken along line VII—VII in FIG. 5.

FIGS. 5 to 7 show a lockup mechanism 41 of a torque converter including a lockup damper of a second embodiment of the invention. An engine (not shown) is disposed at a left side of FIGS. 6 and 7, and a transmission (not shown) is disposed at a right side of FIGS. 6 and 7. FIG. 5 is a fragmentary cross section of the lockup mechanism 41 viewed from the transmission side with a driven plate 45, which will be described later, removed. In the rotating directions in FIG. 5, the rotating direction R1 is the positive rotating direction of the engine and the torque, and the rotating direction R2 is the negative rotating direction.

The torque converter has general features well known in the art such as a turbine, a stator and an impeller, and as such, will not be described below.

FIG. 6 shows a front cover 90 (input rotary member) and a turbine 92 (output rotary member) of the torque converter. The front cover 90 is coupled to a crank shaft of the engine, and defines a working fluid chamber of the torque converter together with an unillustrated impeller. The front cover 90 is provided at the inner wall or surface of its outer peripheral portion with a flat annular friction surface 91. The turbine 92 is a vane wheel axially opposed to the unillustrated impeller, and is primarily formed of a turbine shell 93 and a plurality of turbine blades 94 fixed to the turbine shell 93. The inner peripheral portion of the turbine shell 93 is coupled to a main drive shaft (not shown) of the transmission through a turbine hub.

The lockup mechanism 41 is provided for mechanically transmitting the torque from the front cover 90 to the turbine 92 while absorbing and damping a torsional vibration transmitted thereto. The lockup mechanism 41 has a clutch function and a damper function (lockup damper). The lockup mechanism 41 is disposed, as shown in FIG. 6, in a space between the front cover 90 and the turbine 92. The lockup mechanism 41 is primarily formed of an input member which is formed of a piston 42 and drive plates 43, and an output member primarily formed of the driven plate 45 as well as first and second coil springs (first and second elastic members) 47 and 48 and an intermediate plate or member 44 which are disposed between the input and output members.

The input member is formed of the piston 42 and the drive plates 43.

The piston 42 is a clutch member which is operable to move toward or away from the front cover 90 in accordance with control of the hydraulic pressure in the torque converter main unit. The piston 42 is substantially formed of a circular plate, and has inner and outer peripheral projections 51 and 52. The inner and outer peripheral projections 51 and 52 have cylindrical forms, respectively, and extend toward the transmission. The inner peripheral projection 51 is carried relatively rotatably and axially movably on the outer peripheral surface of the turbine hub (not shown). A side surface of the piston 42 is covered with a circular friction facing 42a which is fixed thereto and is opposed to the friction surface 91 of the front cover 90.

Figure 9:
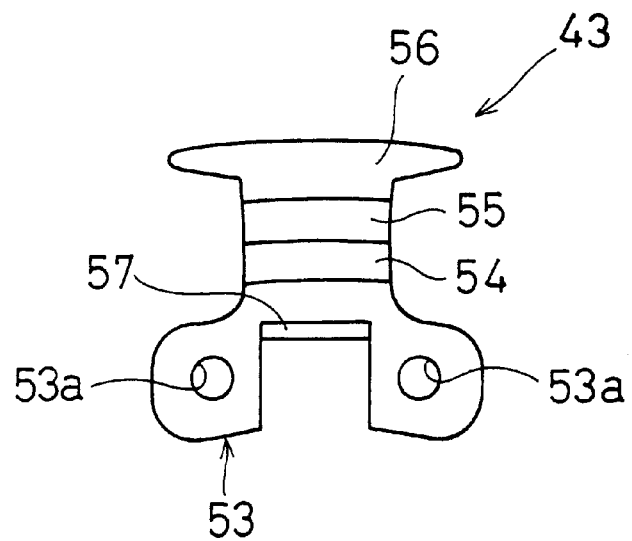
FIG. 9 is a plan of a drive plate of the lockup mechanism shown removed from the other elements of the second embodiment.

The drive plates 43 are fixed to the piston 42, and are provided for supporting, in the rotating direction, first and second coil springs 47 and 48. The drive plates 43 are arranged beside the outer peripheral portion of the piston 42 and radially inside the outer peripheral projection 52, and are located at circumferentially equally spaced four positions. As shown in FIGS. 5, 6 and 9, each drive plate 43 is formed of a fixing portion 53, a radially inner convex portion 54 extending from the outer periphery of the fixing portion 53 toward the transmission, a radially outer concave portion 55 located radially outside the inner convex portion 54 and opened toward the engine, a radially outer engagement portion 56 located radially outside the outer concave portion 55, and an input engagement portion 57 formed by partially cutting and bending a circumferentially central portion of the fixing portion 53 and extending toward the transmission. The inner convex portion 54, outer concave portion 55 and outer engagement portion 56 can be in contact with the radially inner, middle and outer portions of first and second spring seats 70 and 71, which will be described later and are attached to the end surfaces of the first and second coil springs 47 and 48, respectively. The fixing portion 53 is provided with apertures for rivets 50. The drive plate 43 is fixed to the piston 42 by rivets 50 and functions as a member at the input side. Since the inner convex portion 54, outer concave portion 55 and outer engagement portion 56 support a plurality of portions at radially different positions of the end surfaces of the first and second coil springs 47 and 48 via the first and second spring seats 70 and 71, the first and second coil springs 47 and 48 are supported stably. The outer peripheral surface of the outer engagement portion 56 is in contact with the inner peripheral surface of the outer peripheral projection 52 of the piston 42. This facilitates positioning of the drive plate 43, and suppresses the deformation of the drive plate 43 in the radially outward direction. The input engagement portion 57 is disposed in a first opening 62 at the intermediate plate 44, which will be described later, as shown in FIGS. 5 and 6.

The first and second coil springs 47 and 48 are coupled together via the intermediate plate 44, and thereby form a coil spring set. Four coil spring sets thus formed are arranged at circumferentially equally spaced positions, and are adapted to operate in parallel with each other. The first coil spring 47 has a larger rigidity than the second coil spring 48. This provides the damper characteristics having two stages. In each coil spring set, the first coil spring 47 is located at the front, in the positive rotating direction R1, of the second coil spring 48 with a middle support portion 61 of the intermediate plate 44 therebetween. The first spring seat 70 is arranged at the forward end, in the positive rotating direction R1, of the first coil spring 47. The first spring seat 70 has a circular disk-like support portion and an engagement portion extending from the support portion into the coil spring. The rear surface of the support portion of the first spring seat 70 is supported by the inner convex portion 54, outer concave portion 55 and outer engagement portion 56 of the drive plate 43, or the spring support portion 45b of the driven plate 45, which will be described later (see FIG. 6). The second spring seat 71 is arranged at the forward end, in the negative rotating direction R2, of the second coil spring 48. The second spring seat 71 has the same structure as the first spring seat 70, and is likewise supported by the drive plate 43 or driven plate 45.

The intermediate plate 44 is operable between the first and second coil springs 47 and 48, and has an annular portion or ring 60, the middle support portion 61, and the first and second openings 62 and 63 which are substantially formed at radially middle portions of the ring 60.

The middle support portion 61 is arranged between the forward end, in the negative rotating direction R2, of the first coil spring 47 and the forward end, in the positive rotating direction R1, of the second coil spring 48 for allowing transmission of the torque between the first and second coil springs 47 and 48. The middle support portion 61 is provided at its opposite sides, in the rotating direction, with first and second projections 61a and 61b projecting in the rotating direction. The first and second projections 61a and 61b are inserted into the first and second coil springs 47 and 48, respectively. The four middle support portions 61 are coupled together by the ring 60. Thereby, the radially outward movement of each middle support portion 61 is restricted. As a result, the radially outward movement of the forward end in the negative rotating direction R2 of the first coil spring 47 and the forward end in the positive rotating direction R1 of the second coil spring 48 is restricted.

As shown in FIG. 5, the first and second openings 62 and 63 are formed at the radially middle portion of the ring 60. The first openings 62 are located at circumferentially equally spaced four positions, and the second openings 63 are also located at circumferentially spaced four positions.

Figure 10:
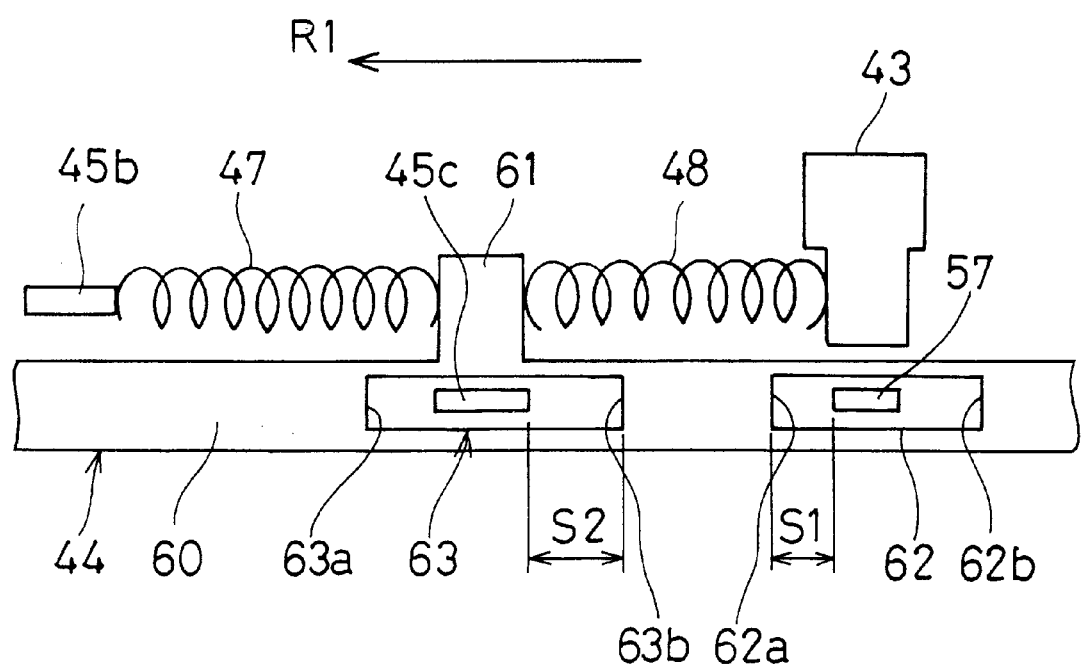
FIG. 10 is a diagram showing a lockup damper of the second embodiment.

The first openings 62 are located at positions opposed to the drive plate 43, and the input engagement portions 57 of the drive plate 57 extend through the openings 62, respectively (see FIG. 6). As shown in FIGS. 5 and 10, the circumferentially opposite end surfaces of the first opening 62 form a first front engagement portion 62a and a first rear engagement portion 62b engageable with the input engagement portion 57, respectively. The first front engagement portion 62a is the front end surface, in the rotating direction R1 of the torque converter 1, of the first opening 62. The first rear engagement portion 62b is the rear end surface, in the rotating direction R1 of the torque converter 1, of the first opening 62.

The second openings 63 are located radially inside the middle support portions 61, and the output engagement portions 45c of the driven plate 45 extend through the openings 63, respectively (see FIG. 7). The circumferentially opposite end surfaces of the second opening 63 form a second front engagement portion 63a and a second rear engagement portion 63b engageable with the output engagement portion 45c, respectively. The second front engagement portion 63a is the front end surface, in the rotating direction R1 of the torque converter 1, of the second opening 63. The second rear engagement portion 63b is the rear end surface, in the rotating direction R1 of the torque converter 1, of the second opening 63.

The output member is formed of the driven plate 45 and the support ring 46.

Figure 8:
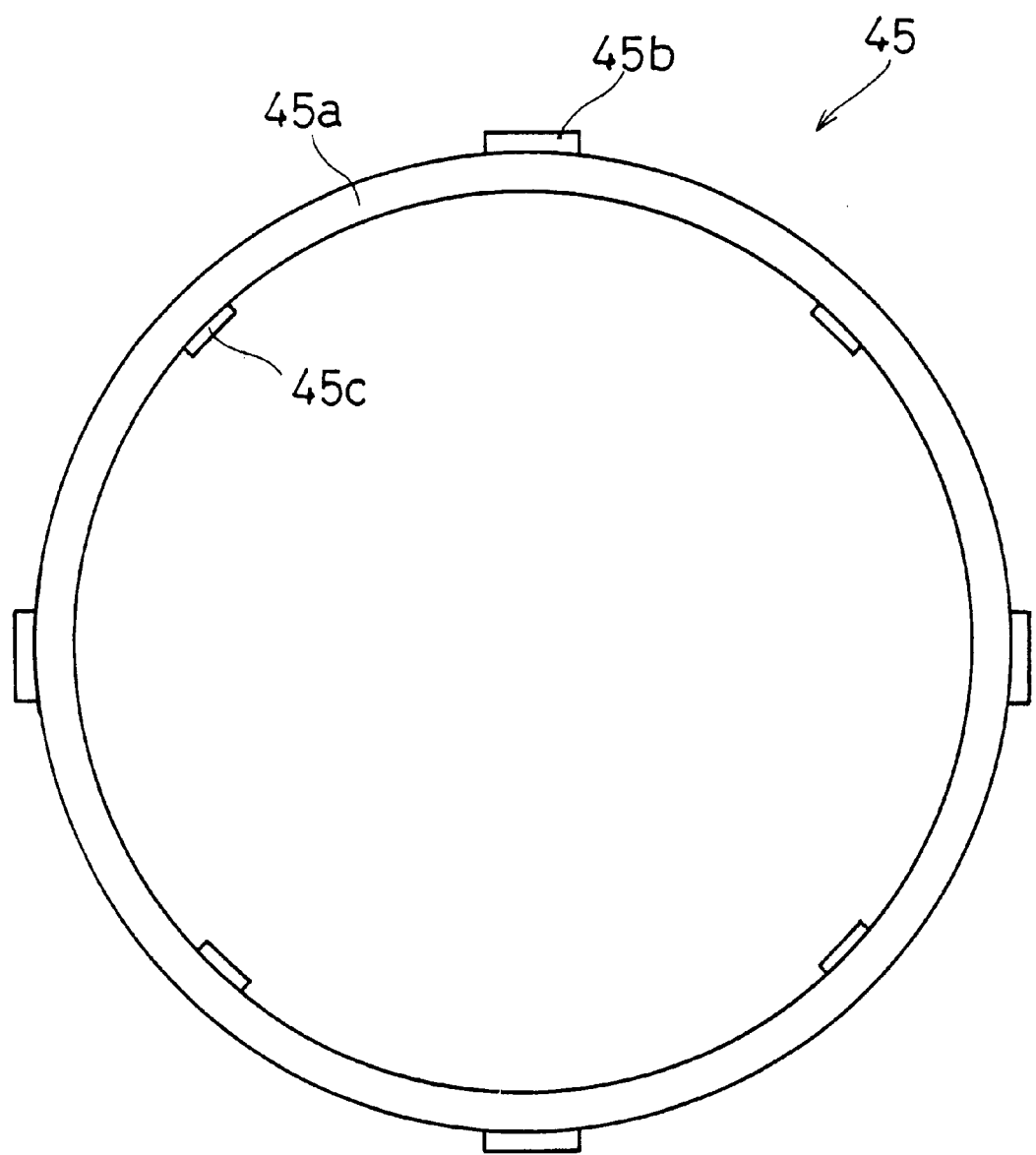
FIG. 8 is a plan view of a driven plate of the lockup mechanism shown removed from the other elements of the second embodiment.

The driven plate 45 is a member fixed to the turbine shell 93 of the turbine 92, and has an annular portion 45a, four engagement portions 45c formed at the outer periphery of the annular portion 45a and four output engagement portions 45c formed at the inner periphery of the annular portion 45a, as shown in FIG. 8. The annular portion 45a is welded to the turbine shell 93. Each spring support portion 45b extends from the annular portion 45a toward the engine and is inserted between two coil spring sets which neighbor to each other and each include first and second coil springs 47 and 48. The spring support portion 45b extends into the outer concave portion 55 at the drive plate 43, and has the circumferentially opposite ends which are in contact with the first and second spring seats 70 and 71, respectively. The output engagement portion 45c extends from the annular portion 45a toward the engine, and extends through the second opening 63 at the intermediate plate 44 (see FIG. 7).

The support ring 46 is an annular metal plate produced by press working, and is basically formed of a cylindrical portion 65 and a circular plate portion 66 extending radially inward from the end of the cylindrical portion 65 near the transmission. The circular plate portion 66 is provided at circumferentially equally spaced four positions of its inner periphery with recessed engagement portions 67. The spring support portions 45b of the driven plate 45 are inserted into and engaged with the recessed engagement portions 67, respectively. Thereby, the support ring 46 rotates together with the driven plate 45. The spring portion 45b and the recessed engagement portion 67 are axially disengageably engaged together for easy assembly. At each position provided with the recessed engagement portion 67, the circular plate portion 66 is bent toward the transmission to form a spring contact portion 68. The spring contact portion 68 is in contact with the first and second spring seats 70 and 71. The cylindrical portion 65 is located radially inside the outer peripheral projection 52, and covers the outer peripheries of the first and second coil springs 47 and 48. The cylindrical portion 65 is located near the outer peripheral projection 52 of the piston 42, but a space is kept between them. The cylindrical portion 65 covering the outer peripheries of the first and second coil springs 47 and 48 prevents radially outward disengagement and others thereof.

An operation will now be described below.

A torque of the crank shaft of the engine is supplied to the front cover 90 via a flexible plate (not shown). The torque is transmitted to the unillustrated impeller. When the impeller rotates, the working fluid flows toward the turbine 92 to rotate the same. The torque of the turbine 92 is output to the main drive shaft through the unillustrated turbine hub.

When the speed ratio of the torque converter increases and the main drive shaft attains a predetermined rotation speed, the working fluid between the piston 42 and the front cover 90 is drained through the interior of the main drive shaft. As a result, a pressure difference presses the piston 42 to the friction surface 91 of the front cover 90. Thereby, the torque of the front cover 90 is transmitted to the turbine 92 through the lockup mechanism 41. Thus, the front cover 90 is mechanically coupled to the turbine 92, and the torque of the front cover 90 is output directly to the main drive shaft without passing through the impeller. In the engaged state of the lockup clutch, the drive plate 43 pushes, in the positive rotating direction R1, the first and second coil springs 47 and 48 coupled together by the intermediate plate 44, so that the first coil spring 47 pushes the spring support portion 45b of the driven plate 45 and the spring contact portion 68 of the support ring 46. Thereby, the torque is transmitted from the piston 42 to the driven plate 45.

In the engaged state of the lockup clutch, the lockup mechanism 41 transmits the torque and also operates to absorb and damp the torsional vibration transmitted from the front cover 90. More specifically, the first and second coil springs 47 and 48 expand and contract between the drive plate 43 and the driven plate 45, whereby the torsional vibration is absorbed and damped. This will be described in detail with reference to FIG. 10 schematically showing the lockup mechanism.

When the drive plate 43 fixed to the piston 42 starts to rotate in the direction R1 in FIG. 10 relatively to the driven plate 45 owing to the torque difference between the piston 42 and the driven plate 45, the driven plate 43 pushes the rear ends, in the rotating direction R1, of the coupled first and second coil springs 47 and 48. The forward ends, in the rotating direction R1, of the first and second coil springs 47 and 48 are supported by the spring support portions 45b of the driven plate 45, so that the first and second coil springs 47 and 48 are compressed. In accordance with the relative rotation, the first and second coil springs 47 and 48 are compressed, so that the drive plate 43 rotates relatively to the driven plate 45, and the intermediate plate 44 also rotates through a degree corresponding to a difference in compression length between the first and second coil springs 47 and 48.

After the input engagement portion 57 of the drive plate 43 engages with the first front engagement portion 62a of the first opening 62 at the intermediate plate 44, the drive plate 43 and the intermediate plate 44 are integrally coupled together and rotate relatively to the driven plate 45 (the spring engagement portions 45b, output engagement portions 45c and others). Thereafter, the second coil springs 48 are compressed no longer, and only the first coil springs 47 are further compressed, so that the damper characteristics change (from first stage in R1 to second stage in R2 in FIG. 4).

When the relative rotation is further performed to a certain extent, the second rear engagement portion 63b of the second opening 63 at the intermediate plate 44 engages with the output engagement portion 45c of the driven plate 45. Thereby, the drive plate 43 and driven plate 45 are coupled together via the intermediate plate 44 for integral rotation in the rotating direction R1, so that relative rotation between the drive plate 43 and the driven plate 45 is inhibited (change from the second stage in R1 to the stop in FIG. 4). Thus, as shown in FIG. 4, the intermediate plate 44 generates the damper characteristics having the two stages, and also acts as the stop.

In the above operation, the maximum relative rotation angle, which the drive plate 43 can attain in the direction R1 with respect to the driven plate 45 when restricted by the stop, is equal to a value obtained by dividing a product of (s1+s2) and $\pi$, where s1 is the distance between the input engagement portion 57 and the first front engagement portion 62a and s2 is the distance between the output engagement portion 45c and the second rear engagement portion 63b, by a circumferential length of the intermediate plate 44.

When the drive plate 43 rotates in the direction R2 in FIG. 5 relatively to the driven plate 45, a phenomenon opposite to the above occurs. More specifically, after the input engagement portion 57 engages with the first rear engagement portion 62b, the damper characteristics change (from the first stage in R2 to the second stage in R2 in FIG. 4). When the relative rotation occurs further, the second front engagement portion 63a engages with output engagement portion 45c, and the relative rotation of the drive plate 43 with respect to the driven plate 45 is inhibited (characteristics changes from the second stage in R2 to the stop in FIG. 4).

As described above, the lockup damper of the lockup mechanism 41 has the torsion characteristics allowing a large torsion angle and having two stages. Therefore, the torsional vibration can be absorbed and damped efficiently.

THIRD EMBODIMENT

Figure 11:
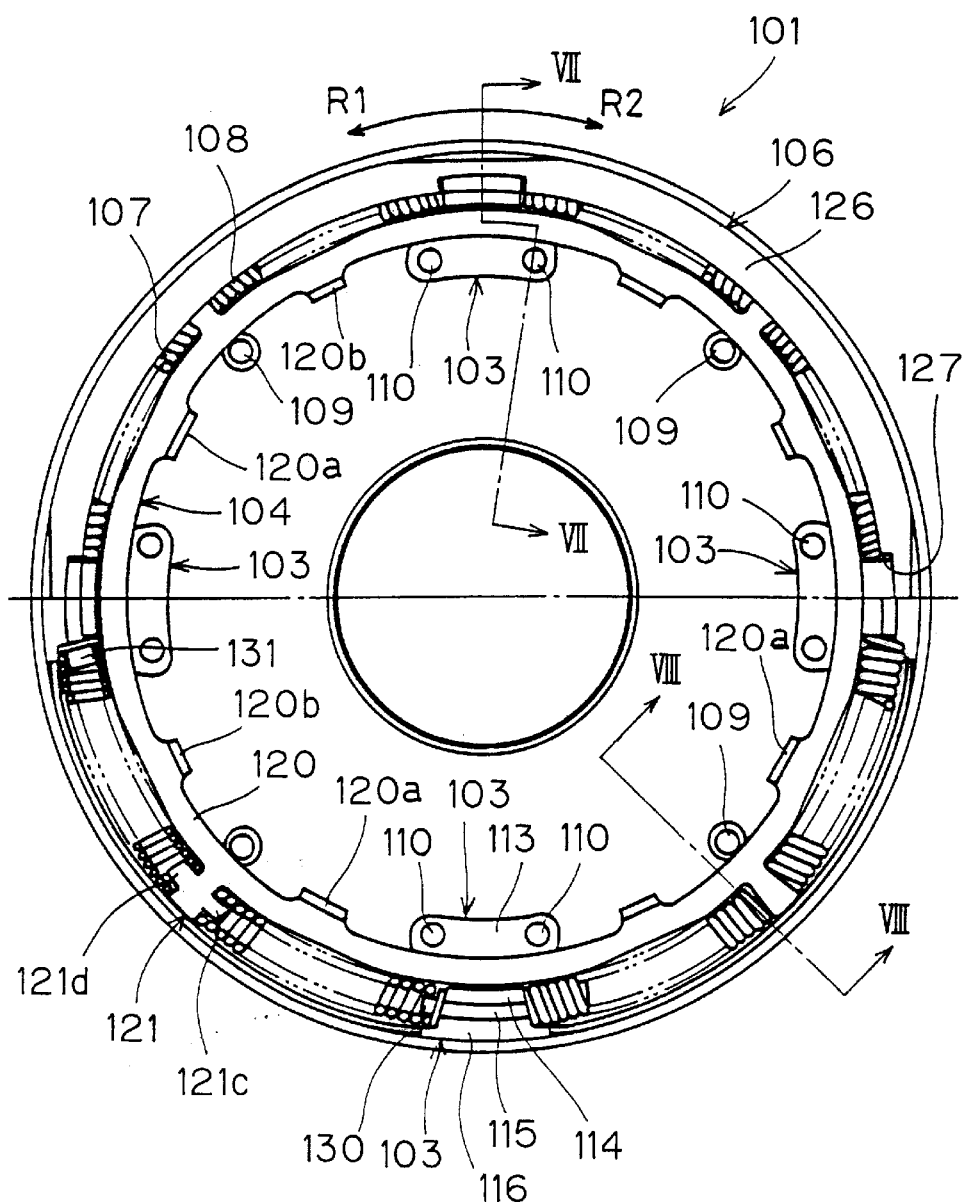
FIG. 11 a part cut away view, part elevation, similar to FIG. 2, showing a lockup mechanism of a torque converter in accordance with a third embodiment of the present invention.
Figure 12:
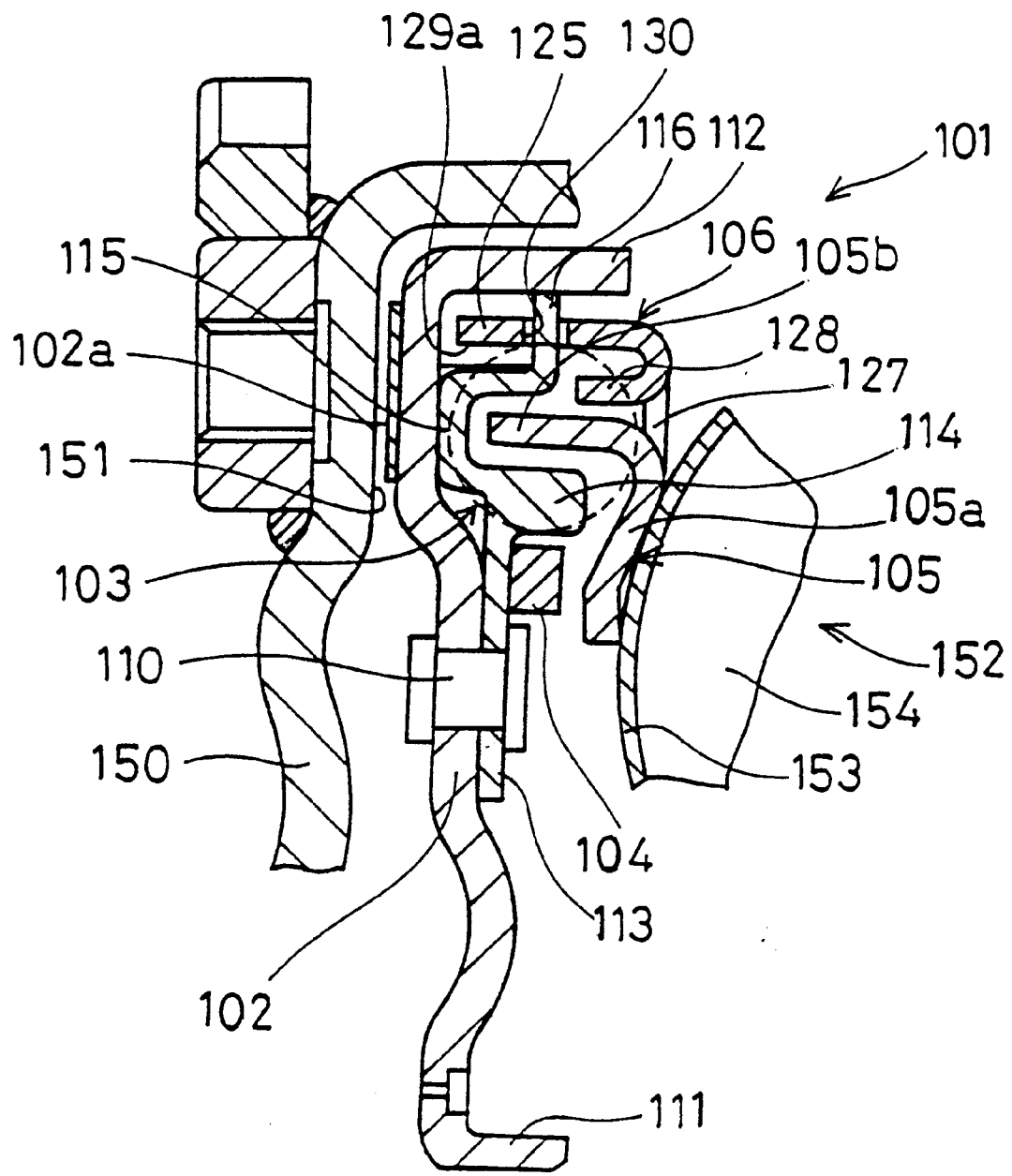
FIG. 12 is a cross section taken along line VII—VII in FIG. 11.
Figure 13:
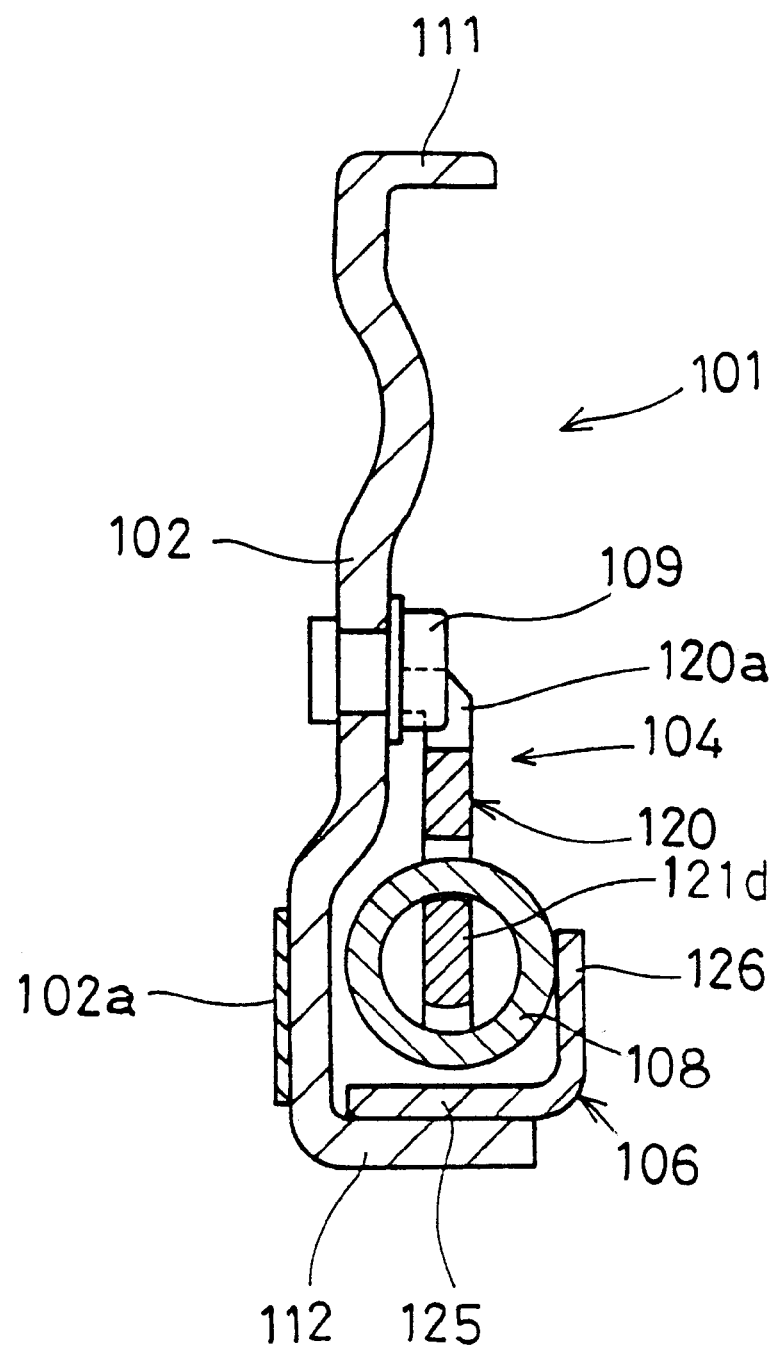
FIG. 13 is a cross section taken along line VIII—VIII in FIG. 11.

FIGS. 11 to 13 show a lockup mechanism 101 of a torque converter including a lockup damper in accordance with a third embodiment of the present invention. An engine (not shown) is disposed on the left side of FIGS. 12 and 13, and a transmission (not shown) is disposed on the right side of FIGS. 12 and 13. FIG. 11 is a fragmentary cross section of the lockup mechanism 101 viewed from the transmission side with an annular portion 105a of a driven plate 105, which will be described later, removed. In the rotating directions in FIG. 11, the rotating direction R1 is the positive rotating direction of the engine and the torque, and the rotating direction R2 is the negative rotating direction.

The torque converter has general structures such as a turbine, a stator and an impeller that are well known in the art, and therefore will not be described below.

FIG. 12 shows a front cover 150 (input rotary member) and a turbine 152 (output rotary member) of the torque converter. The front cover 150 is coupled to a crank shaft of the engine, and defines a working fluid chamber of the torque converter together with an unillustrated impeller. The front cover 150 is provided at the inner wall or surface of its outer peripheral portion with a flat annular friction surface 151. The turbine 152 is a vane wheel axially opposed to the unillustrated impeller, and is primarily formed of a turbine shell 153 and a plurality of turbine blades 154 fixed to the turbine shell 153. The inner peripheral portion of the turbine shell 153 is coupled to a main drive shaft (not shown) of the transmission through a turbine hub.

The lockup mechanism 101 is provided for mechanically transmitting the torque from the front cover 150 to the turbine 152 while absorbing and damping a torsional vibration transmitted thereto. The lockup mechanism 101 has a clutch function and a damper function (lockup damper). The lockup mechanism 101 is disposed, as shown in FIG. 12, in a space between the front cover 150 and the turbine 152.

The lockup mechanism 101 is primarily formed of an input member which is formed of a piston 102 and drive plates 103, and an output member primarily formed of the drive platen 105 as well as first and second coil springs (first and second elastic members) 107 and 108 and an intermediate plate or member 104 which are disposed between the input and output members.

The input member is formed of the piston 102, the drive plates 103 and stop pins 109.

The piston 102 is a clutch member which is operable to move toward or away from the front cover 150 in accordance with control of the hydraulic pressure in the torque converter main unit. The piston 102 is substantially formed of a circular plate, and has inner and outer peripheral projections 111 and 112. The inner and outer peripheral projections 111 and 112 have cylindrical forms, respectively, and extend toward the transmission. The inner peripheral projection 111 is carried relatively rotatably and axially movably on the outer peripheral surface of the turbine hub (not shown). A side surface of the piston 102 is covered with a circular friction facing 102a which is fixed thereto and is opposed to the friction surface 151 of the front cover 150.

The drive plates 103 are fixed to the piston 102, and are provided for supporting, in the rotating direction, first and second coil springs 107 and 108. The drive plates 103 are arranged beside the outer peripheral portion of the piston 102 and radially inside the outer peripheral projection 112, and are located at circumferentially equally spaced four positions. As shown in FIGS. 11 and 12, each drive plate 103 is formed of a fixing portion 113, a radially inner engagement portion 114 extending from the outer periphery of the fixing portion 113 toward the transmission, a concave portion 115 located radially outside the inner engagement portion 114 and opened toward the engine, and a radially outer engagement portion 116 located radially outside the concave portion 115. The inner engagement portion 114, concave portion 115 and outer engagement portion 116 form input engagement portions which can be in contact with the radially inner, middle and outer portions of first and second spring seats 130 and 131, which will be described later and are attached to the end surfaces of the first and second coil springs 107 and 107, respectively. The fixing portion 113 is provided with apertures for the rivets 110. The drive plate 103 is fixed to the piston 102 by rivets 110, as shown in FIG. 12, and functions as a member at the input side. Since the input engagement portions support a plurality of portions at radially different positions of the end surfaces of the first and second coil springs 107 and 108, the first and second coil springs 107 and 108 are supported stably. The outer peripheral surface of the outer engagement portion 116 is in contact with the inner peripheral surface of the outer peripheral projection 112 of the piston 102. This facilitates positioning of the drive plate 103, and suppresses the deformation of the drive plate 103 in the radially outward direction.

Each stop pin 109 is substantially located at the radially same position as the rivet 110 and more specifically is located substantially intermediate the neighboring drive plates 103. As shown in FIG. 13, the stop pin 109 is fixed to the piston 102.

The first and second coil springs 107 and 108 are coupled together via the intermediate plate 104, and thereby form a coil spring set. Four coil spring sets thus formed are arranged at circumferentially equally spaced positions, and are adapted to operate in parallel with each other. The first coil spring 107 has a larger rigidity than the second coil spring 108. This provides the damper characteristics having two stages. In each coil spring set, the first coil spring 107 is located at the front, in the positive rotating direction R1, of the second coil spring 108 with a middle support portion 121 of the intermediate plate 104 therebetween. The first spring seat 130 is arranged at the forward end, in the positive rotating direction R1, of the first coil spring 107. The first spring seat 130 has a circular disk-like support portion and an engagement portion extending from the support portion into the coil spring. The rear surface of the support portion of the first spring seat 130 is supported by the inner engagement portion 114, concave portion 115 and outer engagement portion 116 of the drive plate 103. The second spring seat 131 is arranged at the forward end, in the negative rotating direction R2, of the second coil spring 108. The second spring seat 131 has the same structure as the first spring seat 130, and is likewise supported by the drive plate 103.

Figure 14:
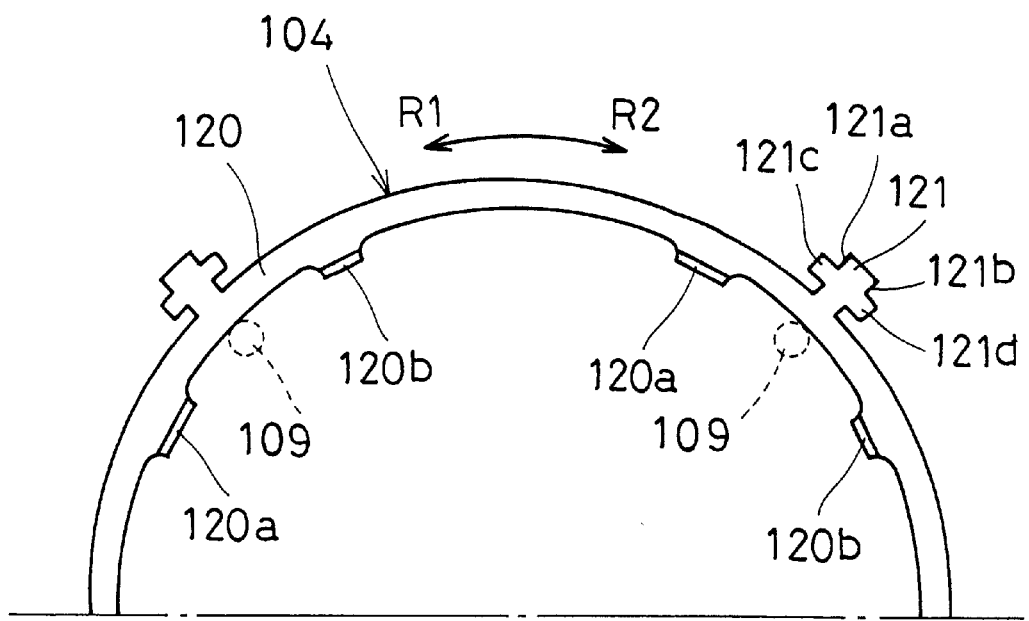
FIG. 14 is a plan of an intermediate plate shown removed from the other elements of the third embodiment.

The intermediate plate 104 is operable between the first and second coil springs 107 and 108, and has a ring 120, a middle support portion 121, and first and second claws (engagement portions) 120a and 120b formed at the inner periphery of the ring 120, as shown in FIG. 14.

The middle support portion 121 is arranged between the forward end, in the negative rotating direction R2, of the first coil spring 107 and the forward end, in the positive rotating direction R1, of the second coil spring 108 for allowing transmission of the torque between the first and second coil springs 107 and 108. The middle support portion 121 has a triangular form converging radially inwardly, and first and second inclined support surfaces 121a and 121b are formed at its opposite sides in the rotating direction. Since the supporting surfaces 121a and 121b are inclined, partial or local contact of the support surfaces 121a and 121b with the first and second coil springs 107 and 108 are suppressed. Therefore, the first and second coil springs 107 and 108 as well as the intermediate plate 104 can have long operational lifetimes. The middle support portion 121 is provided at its opposite sides, in the rotating direction, with first and second projections 121c and 121d projecting in the rotating direction. The first and second projections 121c and 121d extend substantially circumferentially from and therefore perpendicularly to the first and second support surfaces 121a and 121b, and are inserted into the forward end, in the negative rotating direction R2, of the first coil spring 107 and the forward end, in the positive rotating direction R1, of the second coil spring 108, respectively. The first and second projections 121c and 121d are in contact with the inner peripheral surfaces of the first and second coil springs 107 and 108, respectively, as shown in FIG. 13. The four middle support portions 121 are coupled together by the ring 120 serving as the coupling portion. Thereby, the radially outward movement of each middle support portion 121 is restricted. As a result, the radially outward movement of the forward end in the negative rotating direction R2 of the first coil spring 107 and the forward end in the positive rotating direction R1 of the second coil spring 108 is restricted.

The first and second claws 120a and 120b are formed at the inner periphery of the ring 120. The first claws 120a are located at circumferentially equally spaced four positions, and the second claws 120b are also located at circumferentially spaced four positions. Each first claw 120a can engage with the stop pin 109 of the input member when the input member rotates relatively to the output member in the positive rotating direction R1, and thereby can restrict the relative rotation exceeding a predetermined angle between the intermediate plate 104 and the input member to suppress deformation of the second coil spring 108 exceeding a predetermined deformation length, which is allowed in view of the strength. The first claw 120a is arranged at the front, in the positive rotating direction R1, of the stop pin 109, and can engage with the stop pin 109 when the lockup damper is active. The second claw 120b is arranged at the rear, in the positive rotating direction R1, of the stop pin 109, and can engage with the stop pin 109 when the lockup damper is active.

Since the intermediate plate 104 is not directly supported by any other member, a frictional resistance is unlikely to occur.

The output member is formed of the driven plate 105 and the support ring 106. The driven plate 105 is a member fixed to the turbine shell 153 of the turbine 152, and has an annular portion 105a welded to the turbine shell 153, and four engagement portions 105b extending from the annular portion 105a toward the engine and inserted into spaces between the neighboring spring sets, each of which is formed of the first and second coil springs 107 and 108 coupled together with the middle support portions 121 therebetween. The engagement portion 105b extends into the concave portion 115 at the drive plate 103, and has the circumferentially opposite ends which are in contact with the first and second spring seats 130 and 131, respectively. Thus, the engagement portion 105b functions as the output engagement portion.

The support ring 106 is an annular metal plate produced by press working, and is basically formed of a cylindrical portion 125 and a circular plate portion 126 extending radially inward from the end of the cylindrical portion 125 near the transmission. The circular plate portion 126 is provided at circumferentially equally spaced four positions of its inner periphery with recessed engagement portions 127. The engagement portions 105b of the driven plate 105 are inserted into and engaged with the recessed engagement portions 127, respectively. Thereby, the support ring 106 rotates together with the driven plate 105. The engagement portion 105b and the recessed engagement portion 127 are axially disengageably engaged together for easy assembly. At each position provided with the recessed engagement portion 127, the circular plate portion 126 is partially bent toward the transmission to form a spring contact portion 128. The spring contact portion 128 is in contact with the first and second spring seats 130 and 131. Thus, the spring contact portion 128 forms the output engagement portion together with the engagement portion 105b of the driven plate 105. Since the spring contact portions 128 and the engagement portions 105b support the radially different positions of the first and second spring seats 130 and 131 attached to the first and second coil springs 107 and 108, the ends of the first and second coil springs 107 and 108 are supported stably, as can be done also by the input engagement portions. The cylindrical portion 125 is located radially inside the outer peripheral projection 112, and covers the outer peripheries of the first and second coil springs 107 and 108. The cylindrical portion 125 is located near the outer peripheral projection 112 of the piston 102, but a space is kept between them. The cylindrical portion 125 covering the outer peripheries of the first and second coil springs 107 and 108 prevents radially outward disengagement and others thereof. As shown in FIG. 11, a radial space is left between the cylindrical portion 125 and the outer peripheries of the first and second coil springs 107 and 108 when the structure is in the free state. Also, a radial space is left between the cylindrical portion 125 and the middle support portion 121 of the intermediate plate 104.

Since the driven plate 105 and the support ring 106 are formed of the independent members, respectively, these parts can have simple configurations and structures, although the parts increase in number. Therefore, the whole work for the production can be simpler than that in the case where these parts are formed of a single member.

An operation will now be described below.

A torque of the crank shaft of the engine is supplied to the front cover 150 via a flexible plate (not shown). The torque is transmitted to the unillustrated impeller. When the impeller rotates, the working fluid flows toward the turbine 152 to rotate the same. The torque of the turbine 152 is output to the main drive shaft through the unillustrated turbine hub.

When the speed ratio of the torque converter increases and the main drive shaft attains a predetermined rotation speed, the working fluid between the piston 102 and the front cover 150 is drained through the interior of the main drive shaft. As a result, a pressure difference presses the piston 102 to the friction surface 151 of the front cover 150. Thereby, the torque of the front cover 150 is transmitted to the turbine 152 through the lockup mechanism 101. Thus, the front cover 150 is mechanically coupled to the turbine 152, and the torque of the front cover 150 is output directly to the main drive shaft without passing through the impeller.

In the engaged state of the lockup clutch, the input engagement portions (inner engagement portions 114, concave portions 115 and outer engagement portions 116) of the drive plate 103 push, in the positive rotating direction R1, the first and second coil springs 107 and 108 coupled together by the intermediate plate 104, so that the first coil springs 107 push the output engagement portions (engagement portions 105b and spring contact portions 128) of the driven plate 105. Thereby, the torque is transmitted from the piston 102 to the driven plate 105.

In the engaged state of the lockup clutch, the lockup mechanism 101 transmits the torque and also operates to absorb and damp the torsional vibration transmitted from the front cover 150. More specifically, the first and second coil springs 107 and 108 expand and contract between the drive plate 103 and the driven plate 105, whereby the torsional vibration is absorbed and damped.

Figure 19:
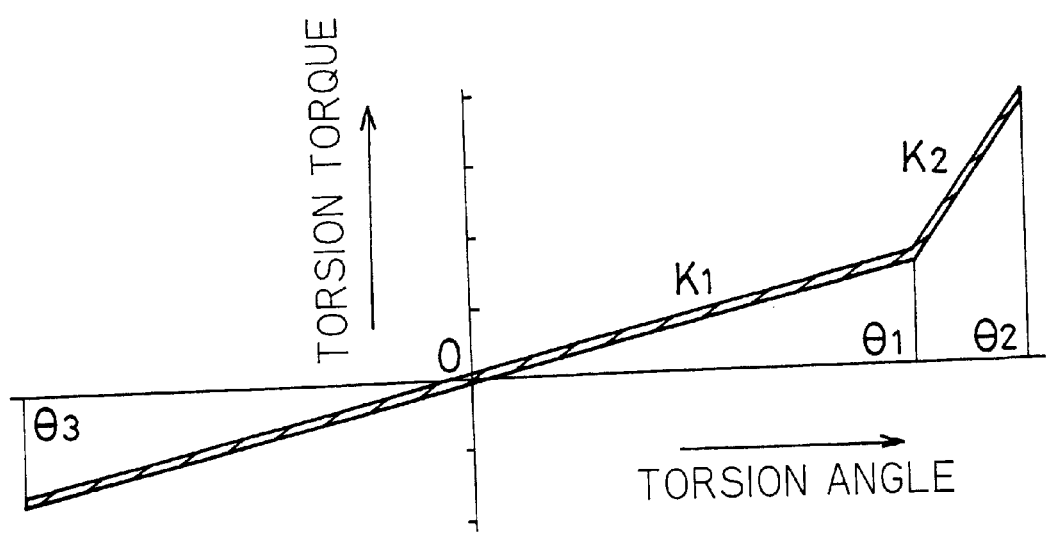
FIG. 19 is a diagram showing torsion angle and torque characteristics of the lockup damper of the third embodiment.

In this embodiment, the first and second coil springs 107 and 108 are coupled to operate in series so that input member can rotate through a large angle with respect to the output member. Therefore, large maximum torsion angle characteristics can be ensured in spite of the fact that the first and second coil springs 107 and 108 are located at the radially outer positions of the torque converter and the lockup mechanism 101. The rigidity (spring constant) of the first coil spring 107 and that of the second coil spring 108 are different from each other and therefore provide the spring characteristics having two stages as shown in FIG. 19. Therefore, the input torsional vibration having the amplitude and frequency of various values can be damped efficiently.

The torsion operation of the lockup mechanism 101 will be described below further in detail with reference to diagrams of FIGS. 15 to 19. The following description will be given assuming that the input members, i.e., the drive plate 103 and stop pins 109 are fixed, and the output member, i.e., driven plate 105 rotates relatively to them.

Figure 15:
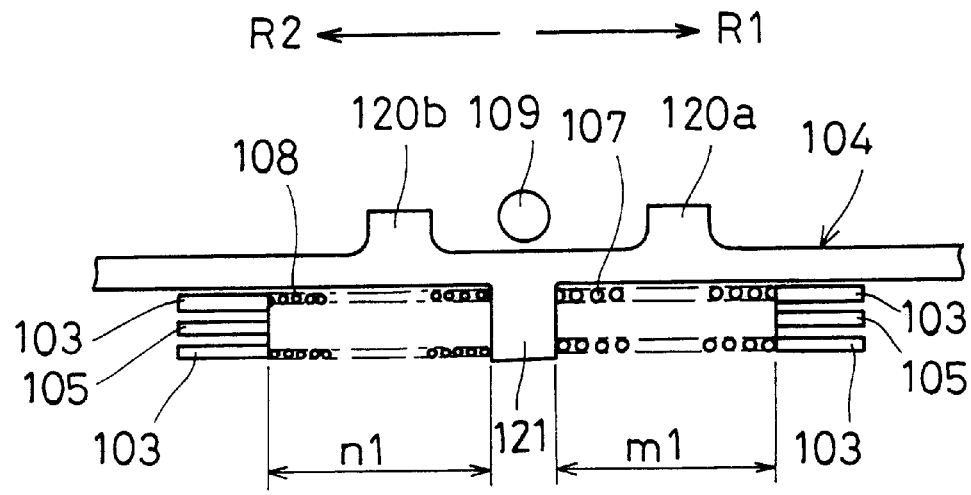
FIG. 15 is a diagram similar to FIG. 3, showing aspects of the lockup damper of the third embodiment in one operational condition.
Figure 16:
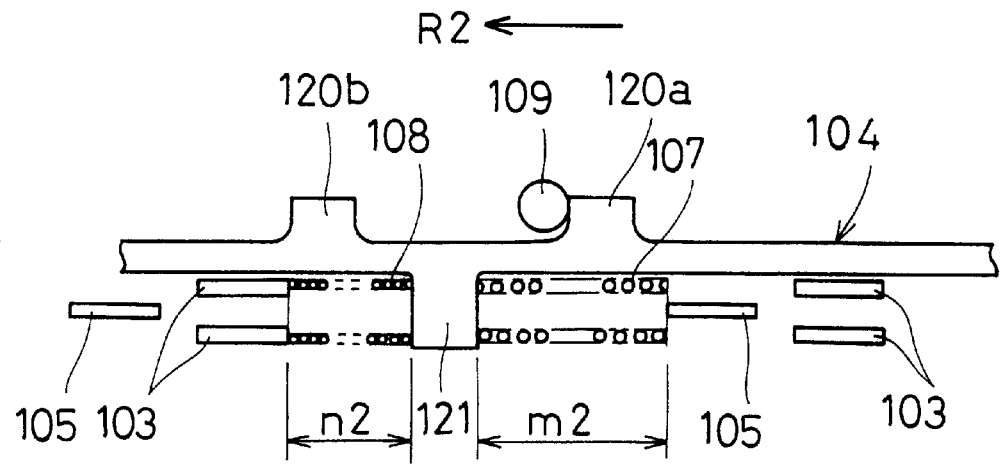
FIG. 16 is a diagram similar to FIG. 15 showing aspects of the lockup damper of the third embodiment in another operational condition.
Figure 17:
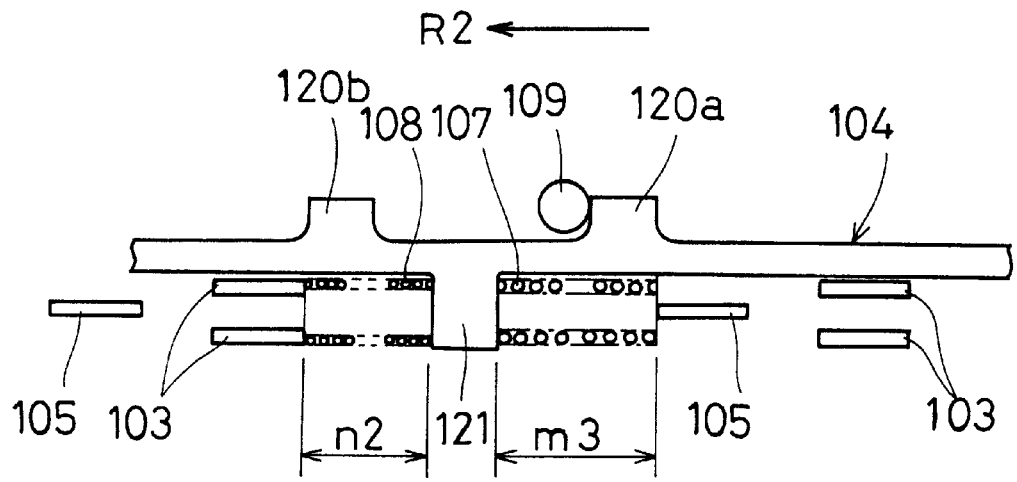
FIG. 17 is a diagram similar to FIGS. 15 and 16 showing the lockup damper of the third embodiment in still another operational condition.

First, description will be given on the case where the driven plate 105 relatively rotates in the negative rotating direction R2 from the neutral or initial position in FIG. 15. In this case, the driven plate 105 pushes the first coil springs 107 in the negative rotating direction R2. This force is transmitted as the elastic reaction force of the first coil springs 107 to the second coil springs 108 via the middle support portions 121. While the torsion angle is small, the second coil spring 108 of a low rigidity is compressed to a large extent, and the first coil spring 107 is compressed only to a small extent. When the torsion angle increases, the first claw 120a of the intermediate plate 104 comes into contact with the stop pin 109, as shown in FIG. 16, so that the relative rotation between the intermediate plate 104 and the drive plate 103 stops. In the neutral state, the first coil spring 107 had a size or length of m1, and the second coil spring 108 had a length of n1. In the above compressed state, the first coil spring 107 has a reduced length of m2, and the second coil spring 108 has a smaller length n2. The second coil spring 108 compressed between the middle support portion 121 of the intermediate plate 104 and the drive plate 103 is not further compressed because the intermediate plate 104 does not further rotate relatively to the drive plate 103. Thus, the second coil spring 103 having a low rigidity and therefore having a durability, which is significantly affected by a large force, is not compressed to a length smaller than the length of n2. The length of n2 is set to a value which is allowed in view of the strength of the second coil spring 108, and thereby the second coil spring 108 can have an intended lifetime. This state corresponds to the torsion angle θ1 in the torsion characteristics shown in FIG. 19. When the torsion angle further increases, the first coil spring 107 arranged between the middle support portion 121 of the intermediate plate 104 and the driven plate 105 is compressed (see FIG. 17). This state corresponds to the torsion angle θ2 in the torsion characteristics-shown in FIG. 19. When the torsion angle increases from the value θ2, the first coil spring 107 will finally function as the stop. However, the first coil spring 107 has the rigidity which is determined to prevent the torsion exceeding the angle θ2 in the normal use of the torque converter. In this embodiment, therefore, the first coil spring 107 is compressed only to the length m3 which causes no problem in strength.

Figure 18:
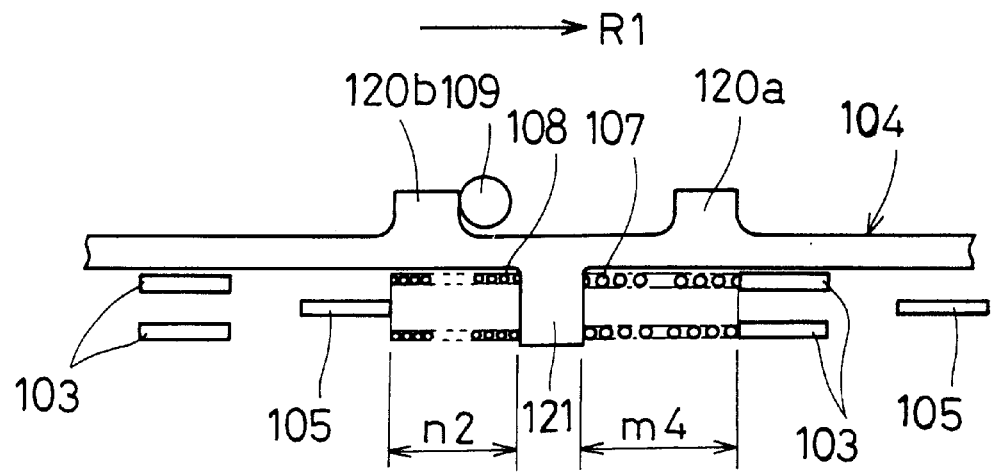
FIG. 18 is a diagram similar to FIGS. 15, 16 and 17 showing the lockup damper of the third embodiment in still a further operational condition.

Then, description will be given on the case where the driven plate 105 relatively rotates in the positive rotating direction R1 from the neutral or initial position in FIG. 15. In this case, the driven plate 105 pushes the second coil springs 108 in the positive rotating direction R1. This force is transmitted as the elastic reaction force of the second coil springs 108 to the first coil springs 107 via the middle support portions 121. While the torsion angle is small, the second coil spring 108 of a low rigidity is compressed to a large extent, and the first coil spring 107 is compressed only to a small extent. When the torsion angle increases, the second claw 120b of the intermediate plate 104 comes into contact with the stop pin 109, as shown in FIG. 18, so that the relative rotation between the intermediate plate 104 and the drive plate 103 stops. This state corresponds to the torsion angle θ3 in the torsion characteristics shown in FIG. 19. A distance between the stop pin 109 and the second claw 120*b* in the free state is determined to compress fully the second coil spring 108 in the above state. Therefore, the fully compressed second coil springs 108 prevent the relative rotation between the driven plate 105 and the intermediate plate 104. Also, the relative rotation between the intermediate plate 104 and the drive plate 103 is prevented by the contact between the second claws 120*b* and the stop pins 109. Thereby, the relative rotation between the driven plate 105 and the drive plate 103 is allowed no longer. Thus, a torque which tends to cause further relative rotation were applied, each second coil springs 108 would operate as a stop, resulting in reduction in lifetime of the second coil spring 108. In the normal operation of the torque converter, however, the driven plate 105 does not rotate through an angle θ3 with respect to the drive plate 103 in the positive rotating direction R1, and therefore an independent stop is not required for protecting the second coil spring 108. In view of reduction of the cost and the number of parts, therefore, this embodiment is provided with only the stop pins 109 as well as the first and second claws 120*a* and 10*b*, and is not provided with another stop mechanism. The second claw 120*b* is employed as the stop, but may be eliminated because the torsion angle does not exceed the value of θ3 during the normal use. If eliminated, the first coil spring 107 is further compressed and will finally operate as a stop when the torsion angle exceeds the value of θ3.

Torsion characteristics K1 in FIG. 19 are produced by combination of the spring characteristics of the first and second coil springs 107 and 108. Torsion characteristics K2 are produced by the spring characteristics of the first coil springs 107 between the lengths m2 and m3.

In stead of the structure using the stop pins 109 as the input members, such a structure may be employed that the first and second coil springs 107 and 108 are arranged at reverse positions, and engagement members (output engagement portions) corresponding to the stop pins 109 are arranged at the output side. In this structure, the second claws (engagement portions) 120*b* operate as the stop when the input member rotate in the positive rotating direction R1 relatively to the output member to a large extent, so that the second coil springs 108 can be protected.

OTHER EMBODIMENTS AND MODIFICATIONS

Although the first embodiment employs the coil springs 13 having the equal elastic modulus, coil springs having a large elastic modulus may be arranged in place of the first and third coil springs 13A and 13C, and coil springs having a small elastic modulus may be arranged in place of the second and fourth coil springs 13B and 13D. In this case, the springs of a small elastic modulus are first compressed between the piston member 9 and the intermediate plate 30, and the springs of a large elastic modulus are compressed between the driven member 10 and the combination of the piston member 9 and the intermediate plate 30 after the piston member 9 and the intermediate plate 30 are integrally coupled together. When the springs of different elastic moduli are used in combination as described above, damper characteristics corresponding to vehicles can be determined more easily. In this structure, it is necessary to modify the recessed ranges and arrangement of the first and second recesses 33 and 34.

If the springs of a large elastic modulus are employed, a large torque can be transmitted when these springs are fully compressed, and the fully compressed springs can be used as stops provided that these springs have a sufficient durability. In this case, it is necessary to protect only springs having a small elastic modulus and therefore a low durability by engaging these springs with the input engagement portions 19 of the intermediate plate 30 or the output engagement portions 12 so as to prevent application of a large load to them.

According to the invention, the lockup damper of the torque converter is provided with the intermediate member having the engagement portion which is engageable with the input or output engagement portion. Therefore, it is possible to suppress application of an extremely large load to the elastic members, so that design specifications of the elastic members can be selected from a wide range, and the torsion characteristics and the stop torques corresponding to vehicles can be easily determined.

The timings of compression of the two elastic members, which are arranged in series with the intermediate member therebetween, can be appropriately set in combination depending on arrangement of the respective engagement portions on the intermediate member. Therefore, the torsion characteristics of the lockup damper can have two stage, and/or different characteristics can be exhibited depending on the rotation direction.

Various details of the present invention may be changed without departing from its spirit or its scope. Furthermore, the foregoing description of the embodiments according to the present invention are provided for illustration only, and not for the purpose of limiting the invention as defined by the appended claims and their equivalents.

What is claimed is:

1. A lockup damper of a torque converter included in a lockup mechanism of the torque converter for mechanically transmitting torque from an input rotary member to an output rotary member, and provided for damping a vibration transmitted from the input rotary member to the output rotary member, comprising:

an input member configured to receive torque from the input rotary member;

an output member outputting the torque to the output rotary member;

a first elastic member arranged between said input member and said output member;

a second elastic member arranged between one of said input or output member and said first elastic member; and an intermediate member having a support portion arranged between said first and second elastic members and circumferentially supporting said first and second elastic members, said intermediate member formed with an engagement portion engageable with at least one of said input and output members;

wherein:

said input member has an input engagement portion engagable with said intermediate member in response to relative rotary displacement therebetween, said output member has an output engagement portion engagable with said intermediate member in response to relative rotary displacement therebetween, said first elastic member has an elastic modulus equal to that of said second elastic member, said intermediate member has a first front engagement portion engagable rearward, in a rotating direction of said torque converter, with said input engagement portion, a first rear engagement portion engagable forwardly, in the rotating direction of said torque converter, with said input engagement portion, a second front engagement portion engagable rearward, in the rotating direction of said torque converter, with said output engagement portion, and a second rear engagement portion engagable forwardly, in the rotating direction of said torque converter, with said output engagement portion, with said input and output rotary members are in a torque free state, a first distance between said input engagement portion and said first front engagement portion is different from a second distance between said output engagement portion and said second rear engagement portion, and a third distance between said input engagement portion and said first rear engagement portion is different from a fourth distance between said output engagement portion and said second front engagement portion, and wherein each of said first and second elastic members have a deformation length determined by the possible amount compression deformation of said first and second elastic members, respectively, with said input and output rotary members in a torque free state, one of said first distance and said second distance is smaller than the deformation length either one of said first and second elastic members, one of said first distance and said second distance is smaller than the deformation length of the other of said first and second elastic members, one of said third distance and said fourth distance is smaller than the deformation length of one of said first and second elastic members, and one of said third distance and said fourth distance is smaller than the deformation length of the other of said first and second elastic members.

2. The lockup damper of the torque converter according to claim 1, wherein said intermediate member includes an annular portion, a support portion provided at said annular portion for supporting said first and second elastic members, a first recess formed in said annular portion and provided at opposite ends thereof with said first front engagement portion and said first rear engagement portion, and a second recess formed in said annular portion and provided at opposite ends thereof with said second front engagement portion and said second rear engagement portion.

3. The lockup damper of the torque converter according to claim 1, wherein said intermediate member includes an annular portion having first and second openings and a support portion, said first opening extending in the axial direction of the torque converter through said annular portion and being provided at circumferentially opposite ends thereof with said first front engagement portion and said first rear engagement portion, said second opening extending in the axial direction of the torque converter through said annular portion and being provided at circumferentially opposite ends thereof with said second front engagement portion and said second rear engagement portion, and said support portion supporting said first and second elastic members, and wherein said input engagement portion is extends into said first opening, and said output engagement portion is extends into said second opening.

4. A lockup damper of a torque converter included in a lockup mechanism of the torque converter for mechanically transmitting a torque from an input rotary member to an output rotary member, and provided for damping a vibration transmitted from the input rotary member to the output rotary member, comprising:

an input member configured to receive torque from the input rotary member;

an output member outputting the torque to the output rotary member;

a first elastic member arranged between said input member and said output member;

a second elastic member arranged between one of said input or output member and said first elastic member; and an intermediate member having a support portion arranged between said first and second elastic members and circumferentially supporting said first and second elastic members, said intermediate member formed with an engagement portion engagable with at least one of said input and output members, wherein said input member has an input engagement portion engagable with said intermediate member in response to relative rotation therebetween, said output member has an output engagement portion engagable with said intermediate member in response to relative rotation therebetween, said first elastic member has an elastic modulus larger than that of said second elastic member, and said intermediate member has a first front engagement portion engagable rearward, in a rotating direction of said torque converter, with said input engagement portion, a first rear engagement portion engagable forwardly, in the rotating direction of said torque converter, with said input engagement portion, a second front engagement portion engagable rearward, in the rotating direction of said torque converter, with said output engagement portion, and a second rear engagement portion engagable forwardly, in the rotating direction of said torque converter, with said output engagement portion;

wherein with said input and output rotary members in a torque free state, a first distance between said input engagement portion and said first front engagement portion is different from a second distance between said output engagement portion and said second rear engagement portion, and a third distance between said input engagement portion and said first rear engagement portion is different from a fourth distance between said output engagement portion and said second front engagement portion, each of said first and second elastic members have a deformation length determined by the possible amount compression deformation of said first and second elastic members, respectively, one of said first distance and said second distance is smaller than the deformation length either one of said first and second elastic members, one of said first distance and said second distance is smaller than the deformation length of the other of said first and second elastic members, one of said third distance and said fourth distance is smaller than the deformation length of one of said first and second elastic members, and one of said third distance and said fourth distance is smaller than the deformation length of the other of said first and second elastic members.

5. The lockup damper of the torque converter according to claim 4, wherein said intermediate member includes an annular portion, a support portion provided at said annular portion for supporting said first and second elastic members, a first recess formed in said annular portion and provided at opposite ends thereof with said first front engagement portion and said first rear engagement portion, and a second recess formed in said annular portion and provided at opposite ends thereof with said second front engagement portion and said second rear engagement portion.

6. The lockup damper of the torque converter according to claim 4, wherein said intermediate member includes an annular portion having first and second openings and a support portion, said first opening extending in the axial direction of the torque converter through said annular portion and being provided at circumferentially opposite ends thereof with said first front engagement portion and said first rear engagement portion, said second opening extending in the axial direction of the torque converter through said annular portion and being provided at circumferentially opposite ends thereof with said second front engagement portion and said second rear engagement portion, and said support portion supporting said first and second elastic members, and wherein said input engagement portion is extends into said first opening, and said output engagement portion is extends into said second opening.

7. The lockup damper of the torque converter according to claim 4, wherein the engagement portion of said intermediate member engages with one of said input and output member to suppress deformation of the second elastic member within an allowable deformation length.

* * * * *